(12) United States Patent
Helms et al.

(10) Patent No.: US 11,609,319 B2
(45) Date of Patent: Mar. 21, 2023

(54) HIGH CONFIDENCE ISOLATED PRESENCE DETECTION IN FINE RESOLUTION REGION

(71) Applicant: Radius Networks Inc., Washington, DC (US)

(72) Inventors: David Helms, Arlington, VA (US);
Timothy Judkins, Vienna, VA (US);
Scott Yoder, Washington, DC (US);
Francis Nguyen, Chicago, IL (US);
Marc Wallace, Arlington, VA (US)

(73) Assignee: Radius Networks, Inc., Washington, DC (US)

( * ) Notice: Subject to any disclaimer, the term of this patent is extended or adjusted under 35 U.S.C. 154(b) by 536 days.

(21) Appl. No.: 16/725,262

(22) Filed: Dec. 23, 2019

(65) Prior Publication Data

US 2021/0190928 A1    Jun. 24, 2021

(51) Int. Cl.
*G01S 13/04* (2006.01)
*G01S 5/02* (2010.01)
(Continued)

(52) U.S. Cl.
CPC .............. *G01S 13/04* (2013.01); *G01S 3/22* (2013.01); *G01S 3/30* (2013.01); *G01S 5/0221* (2013.01);
(Continued)

(58) Field of Classification Search
None
See application file for complete search history.

(56) References Cited

U.S. PATENT DOCUMENTS 5,976,038 A    11/1999    Orenstein et al.
8,326,260 B1   12/2012    Bradish et al.
(Continued)

FOREIGN PATENT DOCUMENTS

CN    106352884 A    1/2017
EP      1143260 A2   10/2001
WO    WO2015042065 A1    3/2015

OTHER PUBLICATIONS

Office Action dated Dec. 10, 2020 in European Patent Application No. 18706899.4, 8 pgs.
(Continued)

*Primary Examiner* — Whitney Moore
(74) *Attorney, Agent, or Firm* — Lee & Hayes, P.C.

(57) ABSTRACT

A radio presence-advertising signal (PAS) a PAS emitter is simultaneously received at two or more co-located directional antennas that are coupled to respective radio receivers. The antennas have reception sensitivity lobes that overlap to define a region of interest at the overlap. Substantially cotemporaneous signal strength indications are obtained from the radio receivers. A difference signal representative of a difference between two of the obtained signal strength indications of the respective antennas is generated. An average signal representative of a running average of two or more of the obtained signal strength indications is generated and used to produce a normalized confidence indicator indicating a level of confidence that the PAS emitter is disposed inside (e.g., centered in) the region of interest or alternatively indicating a level of confidence that the PAS emitter is disposed outside the region of interest. Action is taken or avoided based on the confidence signal.

23 Claims, 9 Drawing Sheets

(51) Int. Cl.
*G06Q 20/32* (2012.01)
*H04W 4/021* (2018.01)
*G01S 3/22* (2006.01)
*G01S 3/30* (2006.01)
*H01Q 19/30* (2006.01)

(52) U.S. Cl.
CPC ...... *G01S 5/02955* (2020.05); *G06Q 20/3224* (2013.01); *H04W 4/021* (2013.01); *H01Q 19/30* (2013.01)

(56) References Cited

U.S. PATENT DOCUMENTS

| | | | |
|---|---|---|---|
| 8,989,094 | B2 | 3/2015 | Bradish et al. |
| 9,135,615 | B1 | 9/2015 | Mutha |
| 9,251,528 | B1 | 2/2016 | McGhie et al. |
| 9,373,091 | B1 | 8/2016 | Belser et al. |
| 9,408,060 | B2 | 8/2016 | Helms et al. |
| 9,645,222 | B2 | 5/2017 | Carey et al. |
| 10,484,831 | B1 | 11/2019 | Helms et al. |
| 2001/0020916 | A1* | 9/2001 | Kurihara ............... G01S 3/36 342/417 |
| 2005/0049940 | A1 | 3/2005 | Tengler et al. |
| 2005/0197158 | A1 | 9/2005 | Silverbrook et al. |
| 2005/0204061 | A1 | 9/2005 | Farchmin et al. |
| 2006/0061476 | A1 | 3/2006 | Patil et al. |
| 2007/0042716 | A1 | 2/2007 | Goodall et al. |
| 2009/0307143 | A1 | 12/2009 | Reistad et al. |
| 2013/0080218 | A1 | 3/2013 | Wildern, IV et al. |
| 2013/0260782 | A1 | 10/2013 | Un et al. |
| 2013/0290096 | A1 | 10/2013 | Lizotte, III |
| 2014/0046802 | A1 | 2/2014 | Hosein et al. |
| 2014/0122040 | A1 | 5/2014 | Marti |
| 2014/0247279 | A1 | 9/2014 | Nicholas et al. |
| 2014/0274136 | A1 | 9/2014 | Edge et al. |
| 2014/0370917 | A1 | 12/2014 | Buchheim et al. |
| 2015/0149307 | A1 | 5/2015 | Thukral |
| 2015/0186941 | A1 | 7/2015 | Anthony et al. |
| 2015/0215762 | A1 | 7/2015 | Edge |
| 2016/0192130 | A1 | 5/2016 | Kahn et al. |
| 2016/0335484 | A1 | 11/2016 | Xie et al. |
| 2016/0337796 | A1 | 11/2016 | Pandharipande et al. |
| 2017/0055112 | A1 | 2/2017 | Westphal et al. |
| 2017/0075518 | A1 | 3/2017 | Ramakrishna et al. |
| 2017/0083893 | A1 | 3/2017 | Beyer et al. |
| 2017/0228732 | A1 | 3/2017 | Badenhorst |
| 2017/0234978 | A1 | 3/2017 | Shvodian et al. |
| 2017/0156042 | A1 | 6/2017 | Kwan et al. |
| 2017/0265046 | A1 | 9/2017 | Chen et al. |
| 2018/0048996 | A1 | 2/2018 | Ciecko |
| 2018/0075518 | A1 | 3/2018 | Werbitt |
| 2018/0096122 | A1 | 4/2018 | Turner et al. |
| 2019/0080384 | A1 | 3/2019 | Radcliffe et al. |
| 2019/0297454 | A1 | 9/2019 | Smith et al. |
| 2019/0361463 | A1 | 11/2019 | Nelson et al. |
| 2021/0241257 | A1 | 3/2021 | Judkins et al. |

OTHER PUBLICATIONS

European Office Action dated Jun. 24, 2021 for European Patent Application No. 18706899.4, a foreign counterpart to U.S. Pat. No. 10,531,229, 9 pages.

International Preliminary Report and Written Opinion dated Aug. 6, 2019, in PCT Application No. PCT/US2018/016336, 10 pgs.

Office Action for U.S. Appl. No. 16/783,087, dated Jun. 21, 2021, Judkins, "Associating Prior Arrangements with On-Premise Manual Transactions and Concomitant Presence of Actor's Presence-Advertising Emitter in Fine Resolution Region", 24 Pages.

Final Rejection dated Nov. 7, 2018 in U.S. Appl. No. 15/884,132, 22 pgs.

Non-Final Rejection dated Mar. 26, 2019 in U.S. Appl. No. 15/884,132, 20 pgs.

Non-Final Rejection dated Apr. 13, 2018 in U.S. Appl. No. 15/884,132, 15 pfs.

PCT Search Report and Written Opinion dated Mar. 31, 2021 for PCT Application No. PCT/US2020/066769, 18 pages.

Office Action for U.S. Appl. No. 16/681,559, dated Aug. 9, 2021, Helms, "Wireless Locator System", 56 Pages.

Grocery Retail Online, "ShopperKit Adds FlyBuy Pickup to Create Seamless Curbside Experience", Aug. 13, 2019, https://www.groceryretailonline.com/doc/shopperkit-adds-flybuy-pickup-to-create-seamless-curbside-experience-0001.

Skip, "Checkout on Your Phone", 2018, downloaded from Internet on Feb. 5, 2020, https://getskip.com/.

Anne D'Innocenzio, "Why Scan-and-Go Technology Is Surging in More Grocery Stores", Feb. 23, 2018, https://www.inc.com/associated-press/supermarket-chain-stores-new-technology-scan-go-customers-amazon-phone-app.html.

Nancy Parode, "How to Use the Airport's Self-Service Check-In Kiosks", Nov. 26, 2019, https://www.tripsavvy.com/airports-self-service-checkin-kiosks-2973028.

Electronicsnotes, "Yagi Antenna/Yagi-Uda Aerial", downloaded from Internet on Feb. 5, 2020, https://www.electronics-notes.com/articles/antennas-propagation/yagi-uda-antenna-aerial/basics-overview.php.

Xirio Online, "Radio Receiver/Terminal Parameters", downloaded from Internet on Feb. 5, 2020, https://www.xirio-online.com/help/en/rx_radio_params.html.

Wikipedia, "Antenna (radio)", downloaded from Internet on Feb. 5, 2020, https://en.wikipedia.org/wiki/Antenna_(radio)#Characteristics.

* cited by examiner

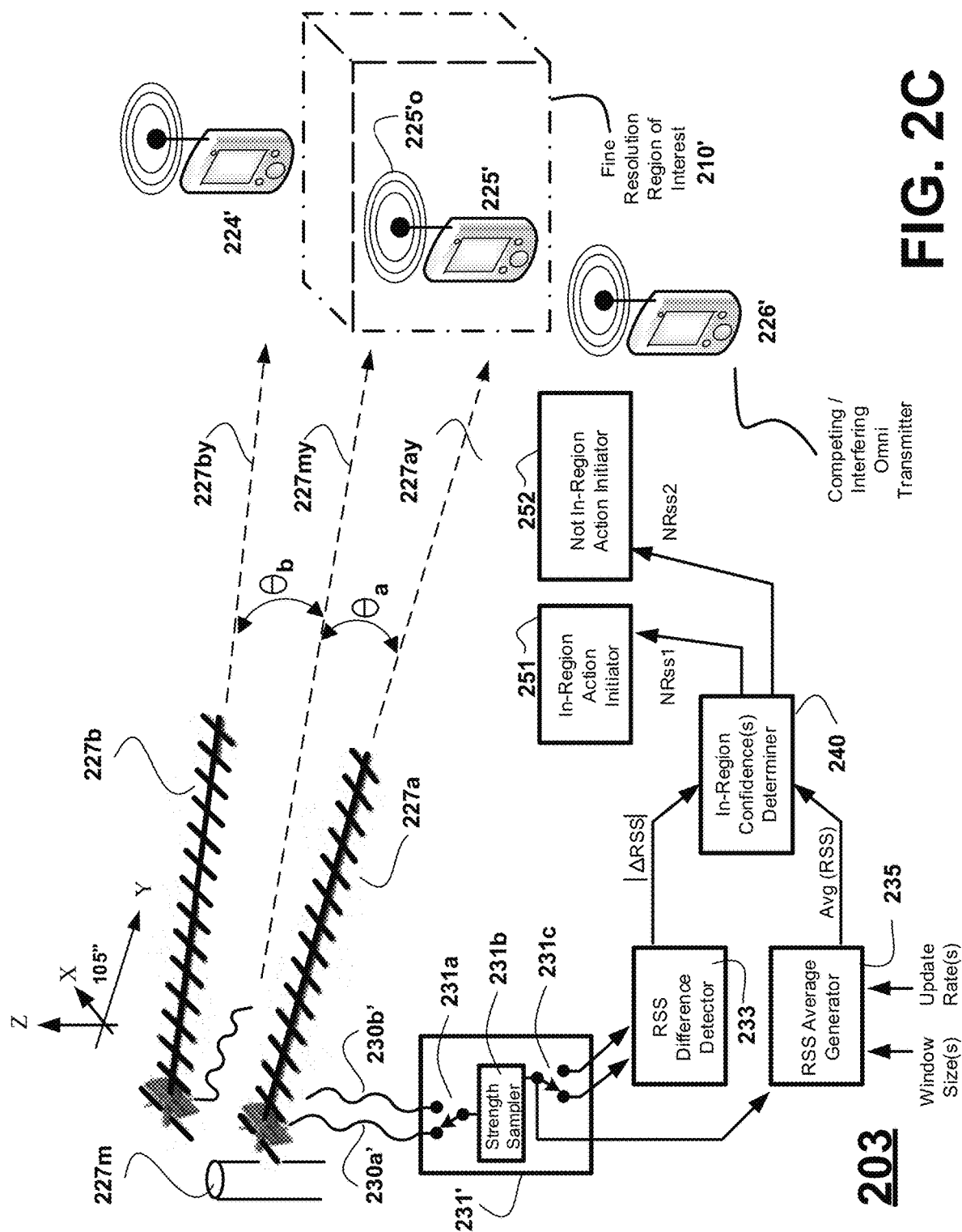

300

HIGH CONFIDENCE ISOLATED PRESENCE DETECTION IN FINE RESOLUTION REGION

CROSS REFERENCE

The disclosures of the following US applications are incorporated herein by reference in their entireties: (1) U.S. Provisional Application No. 62/453,872, filed Feb. 2, 2017; (2) U.S. patent application Ser. No. 15/884,132, filed Jan. 30, 2018 originally entitled "WIRELESS LOCATOR SYSTEM" and claiming priority to said Provisional Application No. 62/453,872; (3) U.S. patent application Ser. No. 16/232,849 filed Dec. 26, 2018 originally entitled LOCAL EPHEMERAL LOCATION TRACKING OF MOBILE DEVICE USERS; and (4) U.S. patent application Ser. No. 16/265,786 filed Feb. 1, 2019 originally entitled "Location Sensitive Queues Management".

BACKGROUND

There is a growing demand for customer-centric online order and appointment/reservation processing as well as to timely servicing of on-premise customers. Providers who are asked to provide requested goods and/or services in timely and high quality manner to online requestors or on-premise customers and to respect appointments or reservations or expectations of or for the same often have to cope with surges and ebbs in volume of arriving orders/appointments and variations in resources at hand for satisfying customer/patron requests as well as coping with fluctuating flows of patron traffic in and out of their establishments. Customer relations may suffer if a patron is made to wait for unexpected long times, asked to accept inferior servicing or has/her order mixed up with that of another.

By way of a nonlimiting example, a fast food restaurant may feature a drive through ordering position at which customers can place orders, a subsequent drive through payment collection window at which customers can pay for ordered items (or optionally pre-pay online and then get a receipt) and a yet further positioned quick-pickup window at which customers can pick up their respectively ordered items. However, if customers are made to wait too long at the respective ordering positions, payment spots and pick-up areas; or if their orders get mixed up with those of others, they may become discouraged and not return to the establishment in the future. Sometimes the problem is due to customers arriving at odd hours when service staff are not expecting them and service staff not being aware that a customer is impatiently waiting at a critical spot (e.g., ordering position, payment spot, item pickup window). Other times, the problem is due to too many customers arriving all at once and creating a tightly packed queuing situation. It is desirable to accurately detect presence of each customer at critical locations without mixing them up with other customers in both times of crowding and in sparse times and to take corresponding immediate action for that individual customer. One method of detecting customer presence involves detecting presence of a presence-advertising beacon signal repeatedly broadcast form a customer device such as a customer's cell phone (or smartwatch or other PAS emitter). More specifically, when Bluetooth is enabled in the customer's cell phone, the cell phone will repeatedly output a Bluetooth beacon signal that broadcasts the presence of that Bluetooth device in the vicinity together with a relatively unique identity. However, determining the presence of the user and their cell phone in a specific vicinity based on received beacon signals can be an inconsistent and inaccurate endeavor when the received signal is reflected and/or attenuated and/or otherwise affected by various external factors including how the cell phone is being held by the customer, what position the customer is relative to radio signal reflectors and/or attenuators such as may be found within a vehicle and other such external factors. Solutions are needed.

It is to be understood that some concepts, ideas and problem recognitions provided in this description of the Background may be novel rather than part of the prior art.

BRIEF SUMMARY

In one embodiment, there is provided a machine-implemented method that provides high confidence presence detection of a radio emitter of a repeatedly broadcast presence-advertising signal (herein "PAS" and also "PA-signal") despite variations in transmission characteristics from a specific region of interest. The PAS could be a Bluetooth beacon signal or another beacon signal. Any repeatedly broadcast radio signal that can be detected as specifically indicating presence of its emitter in a relevant finite area can serve as a PAS. In one embodiment, the method comprises: (a) simultaneously receiving at two or more co-located directional antennas that are coupled to respective radio receivers, a presence-advertising signal (PAS) that has been broadcast from a PAS emitter disposed in or near to a region of interest adjacent to the co-located directional antennas, the region of interest being one that in one embodiment is overlapped by partial parts of reception sensitivity lobes of the directional antennas; (b) obtaining signal strength indications (e.g., RSSI's) from the respective radio receivers; (c) producing a difference signal representative of a difference between two of the obtained signal strength indications of the respective antennas; (d) producing an average signal representative of a running average of two or more of the obtained signal strength indications; (e) producing a normalized signal strength signal using a ratio that includes the difference signal on one side of the ratio (e.g., the numerator side) and the average signal on an opposed side of the ratio (e.g., the denominator side); (f) generating a confidence signal based on the normalized signal strength signal, the confidence signal indicating a level of confidence that the PAS emitter is disposed inside the region of interest or alternatively indicating a level of confidence that the PAS emitter is disposed outside the region of interest; and (g) taking an action or avoiding an action based on the confidence signal. In one embodiment, the action includes associating a user and/or an order for a product and/or a service with a unique identification provided by or assigned to the PA-signal of the PAS emitter that is disposed in the region of interest.

In one embodiment, there is provided a machine system that is responsive to a likelihood that a PAS emitter is present within a predetermined fine resolution region of interest, the system comprising: (a) two or more co-located directional antennas structured to receive presence-advertising signals (PAS's) repeatedly broadcast from the PAS emitter and to relay the received signals to one or more respective radio receivers used for demodulating the received signals, the co-located directional antennas being directed to cover the predetermined fine resolution region of interest; (b) respective signal strength measuring circuits in the respective one or more radio receivers, the measuring circuits structured to determine corresponding strengths of the radio PAS's that were received at a substantially same time by two or more of the co-located directional antennas; (c) a first generator structured to generate from the determined strengths, a current strength difference signal for at least one pair of the two or more respective radio PAS's that were received at a substantially same time by two or more of the co-located directional antennas, the generated current strength difference signal indicating a difference between a first of the determined corresponding strengths, that is optionally weighted, and a second of the determined corresponding strengths, that is optionally weighted; and (d) a second generator structured to use the generated current strength difference signal to generate a confidence signal that indicates the likelihood of presence of the PAS emitter within the predetermined fine resolution region of interest. In one embodiment, the system further comprises: (e) a third generator structured to generate from the determined strengths, a current over-time averaged strength signal for the received signals, the generated current over-time averaged strength signal indicating a current average value for two or more and optionally weighted ones of the determined strengths; (f) wherein in the system the second generator is further structured to use the generated current over-time averaged strength signal to generate the confidence signal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

FIG. 2C is a schematic of a variation of FIG. 2B where a single radio receiver with switching action is used.

DETAILED DESCRIPTION

Figure 1:
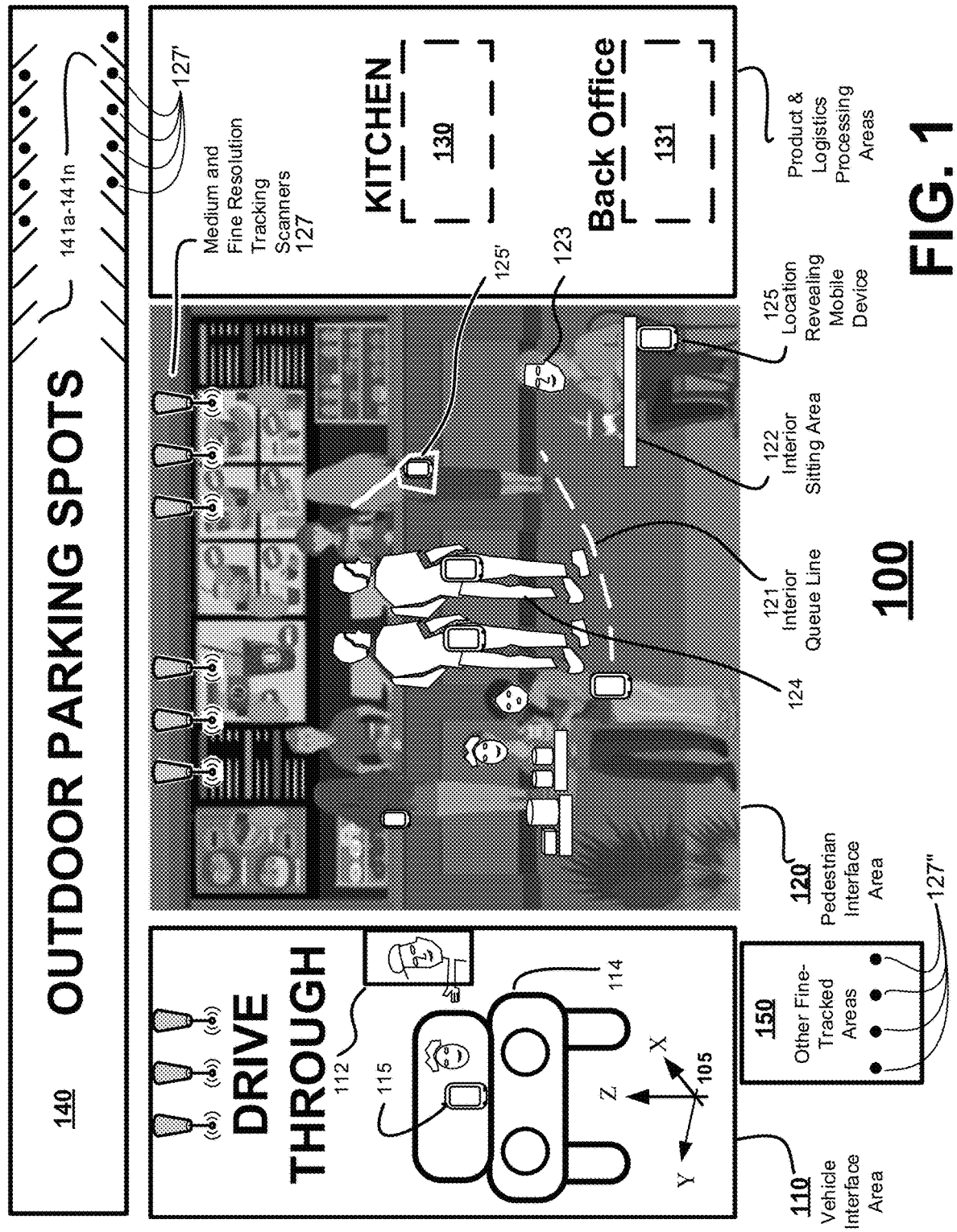
FIG. 1 is a schematic diagram of an environment in which high confidence isolated presence detection can be desirable despite variations in transmission factors for a radio presence-advertising signal transmitter (PAS transmitter) in a desired region of interest.

The disclosure relates to technology using resources of wireless networks and personal mobile communicators to detect presence of expecting recipients of goods and/or services and to provide high confidence isolated presence detection of an emitter of a repeatedly broadcast presence-advertising radio signal (PAS) associated with a recipient in a fine resolution region (e.g., a 1×2 meter or smaller region) despite relatively varied signal transmission factors that can affect reception characteristics such as Received Signal Strength Indication (RSSI) in that region. More specifically, the variation in signal transmission factors for that region may be due to the disposition of the personal mobile communicator (e.g., the customer's PAS broadcasting device, for example their smartphone) in a transmission attenuating and/or reflecting location such as within the metallic frame of a vehicle and/or the orientation of the personal mobile communicator or other such factors (e.g., disposed under a metal tray or metal table).

In one embodiment, a mobile wireless device normally or routinely carried by the recipient (e.g., the recipient's smartphone, smart watch or other such routinely carried or worn mobile device) is used to keep track of the location of the recipient and in particular to detect high likelihood of presence of the recipient in critical location such as presence adjacent to an order placing microphone, speaker and/or manual-entry touch screen. High likelihood of presence is discussed here rather than absolute sureness of presence because variations in signal reception characteristics such as RSSI due to external attenuating and/or reflecting factors can still result in inaccurate presence detection. One way of reducing doubt that a specific PAS emitter is disposed inside of a fine resolution region of interest is by double checking (or triple or greater checking) for substantial identity of (substantial correlation between) reception characteristics at a same or substantially same time by two or more co-located but independent antennas that are oriented to receive radio signals from the fine resolution region of interest. Substantial identity of substantially cotemporaneous reception characteristics can include: (a) same or substantially same received signal strengths; (b) same or substantially same received signal polarizations; and (c) same or substantially same directions of receipt of a transmitted radio signal in the substantially contemporaneously received signals. In addition to this, the present disclosure also relates to management of queuing resources for accommodating traffic flows of expected recipients of goods/services as the recipients make their way to and through respective goods/services provisioning waiting lines (e.g., drive-through windows, payment windows, pick-up areas, counter lines and waited-on seating areas). By double checking (or triple or greater checking) for substantial correlation between reception characteristics at a same or substantially same time of signals received by way of two or more co-located but independent antennas (e.g., directional antennas) that are oriented to receive radio signals from the same fine resolution region of interest, a method in accordance with the present disclosure can reduce doubt that the received signals (e.g., repeatedly broadcast presence-advertising signals) are from one specific PAS emitter that is disposed inside of a fine resolution region of interest from which the independent antennas receive their signals. In one embodiment, the double/greater-checked for reception characteristics include (a) same or substantially same received signal strengths. In the same or another embodiment, the double/greater-checked for reception characteristics include (b) same or substantially same received signal polarizations.

For sake of brevity, "goods/services" will be used herein to refer to the provisioning of any one or more of goods, services and service providers as appropriate for a given context. More specifically and as an example, when a customer makes an appointment with a specific cosmetologist at a beauty salon, the appointment making typically includes an assumption that a chair and/or other service station will be available, that the required hair coloring or other cosmetological products will be available and, importantly, that the service providing cosmetologist will be aware of the presence of the customer and will also be there, ready to provide the requested goods and/or services starting at the appointed time or in a promised or implied time window. High confidence detection of a waiting customer in a waiting area is part of the process.

While one example given here relates to the fast food pre-ordering industry and another to arriving for an appointment with a cosmetologist, the present teachings are not to be limited to just these few examples. There are many aspects of day to day living where appointment-makers, order-placers and/or prospective recipients of goods/services expect to have their presence in a designated waiting location properly noted and corresponding goods/services timely provided at a scheduled time or in a scheduled or implied time span. The respective recipients/appointment-makers may experience dissatisfaction and disappointment if: (a) their expectations are not well managed, (b) if queues for different kinds of patrons (e.g., drive-through ones, sit down waited-upon ones) are not well managed and wait times are substantially longer than planned for, (c) if goods/services provisioning resources are not well managed to coincide with expectations and arrival times of recipients and (d) if the requested goods/services are not provided in timely, high quality manner or not at all. Further examples where similar kinds of issues typically arise include slow-food restaurants where customers arrive at a front end area for seating by a maître d, or where customers are already seated and waiting for a waiter to show up. Yet other examples include medical or alike service providing venues where patients appear at the entrance of an urgent care center and find there is no health provider present to immediately attend to their needs. Entertainment providing venues may have similar problems where customers pre-order tickets online, show up at the theater and find no one present at the will call window. Yet further examples include item-pick up areas where patrons have made appointments to pick up online pre-ordered goods, timely show up at the agreed to pick up area and then have to wait for unreasonably long wait times because service personnel are unaware of their presence.

In accordance with the present disclosure, two or more high gain directional antennas are located next to one another (e.g., within a foot of one another) and aimed (more specifically, horizontally oriented divergently in one embodiment while having a same vertical inclination) to cover a fine resolution region of interest so that, in one embodiment, narrow partial portions of reception sensitivity lobes of the antennas overlap to thereby define the region of interest. (Note: it is believed that the overlapping of narrow fringe portions of the antenna sensitivity lobes may be responsible for the fine resolution detection and isolation observed with this system. However, applicants do not want to be bound by this belief. It works irrespective of the underlying theory.) In one embodiment, substantially cotemporaneous signal strength indications (e.g., RSSI's) are obtained from respective radio receivers (or a samples providing one radio receiver) to which the antennas respectively connect. A relative signal strength difference factor (|ΔRSSI|) is generated from the simultaneously or otherwise substantially contemporaneously received (e.g., sampled) signals of the co-located directional antennas. A running over-time average factor is also generated from the relative signal strengths of the simultaneously or otherwise substantially contemporaneously received signals. (As used herein, the term "substantially contemporaneously" covers simultaneously received radio signals and also those received at substantially the same time so as to allow for pinpointing where a currently stopped or slowly moving target emitter is located. The slowness of movement and degree of resolution for pinpointing will vary according to context.) A normalized signal strength value is derived using a ratio that includes on one side thereof (e.g., the numerator side) an absolute value of the difference factor (|ΔRSSI|) and on the other side thereof (e.g., the denominator side) includes the running average value (Avg(Rss1+Rss2+ . . . )). Thus, the absolute measure units of the receiver generated signal strength indications (RSSI's) substantially cancel out and a normalized signal strength value (NRss) is obtained. This normalized signal strength value (NRss) can be used for further data processing without having to account in the software for specific characteristics of the directional antennas and their respective radio receivers. In one embodiment, the relative signal strength difference and average values are obtained using the IEEE 802.11 RSSI (Relative Signal Strength Indication) data broadcast by protocol compliant wireless devices. In an alternate embodiment, the IEEE 802.11 RCPI (Received Channel Power Indicator) data is used. A somewhat generalized version of the normalized signal strength value may have the form:

$$NRss = 100 - \frac{|Rss1 - Rss2|}{\text{Avg}(Rss1 + Rss2)} \qquad \text{Eq. (1)}$$

where for this example the 100 value is an arbitrarily picked maximum amount, where sampling for the Rss1 and Rss2 amounts is empirically determined based on the RSSI reporting frequencies of the utilized radio receivers (or samples-providing one receiver) and where the chronological window size for the running average factor is also empirically determined. It is within the contemplation of the present teachings to alternatively or additionally use an inverted ratio where the difference factor (|ΔRSSI|) is in the denominator and the running average value (Avg(Rss1+Rss2+ . . . )) is in the numerator. When more than two directional antennas are used, the running average may be that of three or more of the respective receivers (or corresponding samples) while separate difference factors are generated pairwise for different permutations of the antennas. It is also within the contemplation of the present teachings to include various, empirically determined weighting factors and/or nonlinear functions for generating the normalized signal strength value (NRss) and the running average value (e.g., Avg(W1*Rss1+W2*Rss2+ ... )). The weighting factors may include antenna-favoring factors as disclosed later below.

When a PAS transmitter is located at the center of the fine resolution region of interest and equation Eq. 1 is used as the confidence level generating algorithm, the difference value (ARSS) will be at or near zero and the NRss factor will be at its maximum (e.g., NRss=100 in the case of exemplary equation Eq. 1). Also, when the average value (Avg(Rss1+ Rss2+ ... )) is relatively high, meaning the signal of the targeted PAS emitter is not attenuated; the NRss factor will approach its maximum (e.g., NRss=100), When the PAS transmitter is located at one or the other of the ingress or egress sides of the fine resolution region and equation Eq. 1 is used as the confidence level generating algorithm, the absolute difference value (|ARSS|) will typically be at its maximum, the average value (Avg(Rss1+Rss2+ ... )) will be relatively low and the NRss factor will be at a relative minimum. The NRss factor may thus be used as a normalized measure of confidence that a PAS transmitter is located in or centered within the fine resolution region. Or alternatively, it may indicate that a PAS transmitter is not located inside the fine resolution region In one embodiment the fine resolution region of interest has length and width dimensions on the order of two by one meter or less.

It is to be understood that above equation Eq. 1 is merely an example for showing how a normalized confidence factor can be generated. It is not necessary for the confidence factor to be normalized or for the antennas to be equally favored. A non-normalized confidence factor can be instead generated and used in accordance with the following equation Eq. 2:

$$nNRss = A - B*\left|D*Rss1 - (1-D)*Rss2 + \frac{C}{\text{Avg}(Rss1+Rss2)}\right| \qquad \text{Eq. (2)}$$

where A, B and C are empirically picked constants (C is a negative value) and D is a left versus right favoring factor in the range 0 to 1. When D=0.5, the reception strength values obtained from the corresponding antennas are equally favored. The D favoring factor can be programmatically varied to pick the portion of the antennas-covered region (e.g., the center portion) where weighted strengths substantially equalize. Thus, even if the co-located antennas are fixedly mounted, the spot in the region of interest where the received and weighted signal strengths are to substantially match, and thus provide the maximum confidence level, can be programmatically shifted. Although normalization does not occur in equation Eq. 2, the non-normalized confidence factor (nNRss) increases as the favoritism-weighted difference value (ARSS) approaches zero and/or as the average strength value (Avg(Rss1+Rss2+ ... )) increases. Conversely, the non-normalized confidence factor (nNRss) decreases as the favoritism-weighted difference value (ARSS) increases above zero and/or as the average strength value (Avg(Rss1+Rss2+ ... )) decreases. The average strength value may also be generated using favoritism-weighted strength determinations (e.g., Avg(W1*Rss1+ W2*Rss2+ ... )). Appropriate threshold values can be picked empirically for determining if the non-normalized confidence factor (nNRss) provides a sufficient confidence level for respective contexts (e.g., times of day, level of background noise) for concluding that the PAS emitter is in or outside of the region of interest. In one embodiment, when the confidence factor is above a predetermined threshold level, a confidence-based action is taken, for example associating a unique identification provided within the presence-advertising signal (PAS) with a placed order for goods and/or services while the detected PAS emitter is inside the fine resolution region of interest. In one embodiment, thresholds and weighting factors are determined based on over-time machined learned optimizations and historical data stored in a database.

Yet more generally, the generating of the confidence signal may take on the form of the following equation Eq. 3:

$$nNRss = A - B*|D*Rss1 - (1-D)*Rss2|^E - \frac{F}{(\text{Avg}(W1*Rss1+W2*Rss2)^G} - H*\frac{|Rss1-Rss2|}{\text{Avg}(Rss1+Rss2)} \qquad \text{Eq. (3)}$$

where A, B, E, F, G, H, W1, W2 are empirically picked constants and D is a left versus right favoring factor in the range 0 to 1. Power factor E is preferably greater than 1 to thereby accentuate the difference factor. Power factor G is also preferably greater than 1 to thereby accentuate the running average strength factor.

It should be noted here that the locating of users of personal mobile devices is known for relatively coarse levels of resolution. For example, cellular towers may be used to determine presence of cellular smartphones within respective telephone communication cells or as the users cross from one cell to the next (and invoke cellular handovers) or by means of proximity triangulation. In another example, the users' mobile devices use GPS satellite technology (a form of multilateration) to determine respective locations to a resolution of a few meters (e.g., 10's of meters) and to then broadcast this location information. However, for finer levels of resolution based on short range broadcasts, supporting technologies are limited. In particular, if a PAS signal is relatively weak because the PAS transmitter is disposed within a broadcast attenuating environment such as the inside of a metallic vehicle, it becomes difficult to distinguish that PAS from competing background noise or interference by other nearby PAS transmitters. It has been found that the use of the plural co-located directional antennas with partly overlapping and relatively narrow reception sensitivity lobes (e.g., primary forward lobes) in combination with determination of when the received signal strengths for the favoritism-weighted plural antennas null out (ΔRSS=0) works well for determining presence within the narrow region of overlap, with a relatively high level of confidence, of an attenuated PAS emitter even in the presence of background radio noise and/or competing nearby other transmitters.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the present teachings. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

More specifically, when the term "PAS" (presence-advertising signal) or its equivalent "PA-signal" is used herein, it is to be construed broadly unless otherwise specified as encompassing any repeatedly broadcast radio signal that can be detected as specifically indicating presence of its emitter in a relevant finite area. A repeatedly broadcast Bluetooth beacon can qualify as a PAS. Repeatedly broadcast beacons of other types of radio protocols including spectrum hopping ones can qualify as a PAS's. A repeatedly broadcast Wi-Fi signal can qualify as a PAS. The repeated broadcasting of the PAS can be due to built functions of the utilized operating system in the associated mobile device or due to specially installed programs, applications or services (including background peripheral services of BPS's). The PAS may contain an identification that uniquely identifies its mobile device and/or uniquely identifies its user and/or uniquely identifies a specific request for corresponding goods and/or services.

FIG. 1 illustrates an environment (e.g., a fast food retail venue) 100 which can support a number of different online and in-person ordering schemes in accordance with the present disclosure. The schematic illustration depicts the venue 100 as having venue-controlled or venue-monitorable areas such as a vehicle drive-through interface area 110, a pedestrian interface area 120, a product processing area 130, a logistics processing area 131, a vehicle parking area 140 and other customer-traversed areas 150 (e.g., a storefront sidewalk area, a building lobby, an elevator waiting area, an elevator car, a staircase, an escalator, a hallway leading to the venue and so on). For some of relatively small regions among these areas, it can be important for business operations to detect with a high degree of isolation and confidence the presence of a single PAS transmitter in that relatively small region (narrow width region of interest) while not simultaneously recognizing radio signals from nearby other transmitters that are outside the relatively small region (also referred to herein as the fine resolution region of interest). An example of such a region of interest is that adjacent to the verbal order receiving microphone or speaker of a fast food drive through area. Another example of such a region of interest is that adjacent to the order pickup window of a fast food drive through area. Particularly when customers are tightly queued one immediately next to the other it is important that taking of orders and corresponding handing out of ordered goods should not be mixed up when using the PAS emitters of customers as a means for associating the orders with the respective customers.

The above are merely nonlimiting examples of goods/services providing spots that may be found in a patrons-servicing establishment. More specifically, the illustrated establishment 100 may include an interior sitting area 122 (e.g., a waiting area with furniture such as metallic tables and/or metallic chairs) where patrons 123 who have pre-ordered online or at a verbal order taking station while using worn (or carried) location-revealing mobile devices 125 (e.g., from different manufacturers) may wait for the requested items to be delivered to them (to their specific seat) by a service provider (e.g., waiter) or to be notified that the requested items are available at a pick-up window. The establishment may include interior queue lines 121 where other patrons 124 who have pre-ordered online (and who optionally carry or wear location-revealing mobile devices 125'; e.g., sometimes inside a handbag filled with metal objects that attenuate radio signals) or who plan to verbally order at the counter, can line up for more immediate service at a service counter where; when they reach the counter, they expect to immediately receive their preordered items (e.g., fresh hot food items, cold drinks) or have their verbal order immediately taken at that spot. The establishment may include one or more drive-through servicing stations and/or windows 112 (optionally of different kinds, including those with order receiving microphones or speakers) to which driving-through vehicles 114 approach in order to verbally place orders or immediately receive delivery of their online or otherwise pre-ordered (and optionally pre-paid for) items. The driving-through vehicles 114 and/or their drivers may possess location-revealing mobile devices such as smart phones 115, smart watches and so on used for associating the orders with unique identifications broadcast by their location-revealing mobile devices and for thus also associating the orders with the respective customers (and for optionally pre-paying for the goods/services) and for tracking the locations of the location-revealing mobile devices so that the ordered goods/services can be correctly provided to the associated customers.

In one embodiment, the establishment 100 includes or has access to coarse, medium and fine resolution location determining scanners (e.g., Bluetooth™ scanners, Fifth generation (5G) Wi-Fi scanners) 127 which cooperatively interact with software installed in the location-revealing mobile devices 125, 125', 115 of the various patrons 123, 124, 114 for determining to varying degrees of resolution, their respective locations in areas (e.g., 110, 120, 140, 150) for which the establishment has tracking rights or permissions where the tracking can be carried out to respective levels of course, medium and finer resolutions (e.g., the finer being to within about a meter or less). Although not shown in FIG. 1, it is to be understood that the fine resolution location determining scanners 127 are operatively coupled (e.g., wirelessly or by way of cables or IR light beams) to a computer network for relaying location determinations made by them for processing by one or more data processors available on the network. The scanners 127 can keep track to appropriate levels of resolution (e.g., to within 6 feet, 3 feet or less, etc.) of where pedestrians are in the pedestrian interface area 120 and where vehicles are in vehicle accommodating areas such as drive-through lane 110 and parking area 140. Although shown in FIG. 1 only by means of schematic dots, it is also to be understood that the medium and fine resolution location determining scanners 127', 127" or equivalents are also provided in the parking area 140 and in other patron-traversed areas (e.g., surrounding sidewalks). It is to be understood that although Bluetooth™ and 5G directed beam Wi-Fi transceivers are mentioned as examples of medium and fine resolution location determining scanners, the present disclosure is not limited to just these examples. Rather, numerous alternative wireless devices can be used for providing fine resolution location determination (e.g., to a resolution of one meter or less, preferably 2 feet or less) including optical (e.g., IR) and magnetic detectors. In particular, in this disclosure, the use of directional antennas with overlapping narrow portions of their reception sensitivity lobes will be discussed.

There are situations where it becomes desirable to isolate signal reception to a single targeted PAS emitter (e.g., smart phone or smartwatch) in a narrow, fine resolution region of interest while ignoring reception from nearby other PAS transmitters even in cases where the PA-signal from the single targeted PAS emitter is attenuated (e.g., due to a low battery condition and/or due to being partly shielded by metallic structures) and/or in cases where the fine resolution region of interest in which the single targeted PAS emitter is situated has a relatively high radio noise content (low SNR).

Examples of such situations where isolation to a narrow region of interest is desirable include that of a crowded ordering line where one customer at a time approaches a verbal order-taking speaker or microphone to place his/her order while other customers are queued up in close proximity to the ordering station with their respective PAS emitters also turned on. It can be desirable to make sure that each verbally provided order is logically associated with the single PAS emitter of the one customer closest to the verbal ordering speaker or microphone and is not confused with PAS generators of other nearby customers. This can be true for customers who are lined up in respective automobiles having metallic frames (e.g., 114) or for customers who are approaching a walk-up verbal ordering microphone/speaker at the sidewalk. In the case of customers who are lined up in their respective automobiles, the signal strengths generated by their respective PAS transmitters (e.g., 115) can vary based on make or model of the transmitter, based on current battery voltage, based on where within the automobile that transmitter is placed (e.g., against the front windshield, in a side door holding area, under the driver's seat, etc.) and how the internal or external antenna of the transmitter is oriented. Because of all the possible variations, a consistent (e.g., normalized) method of determining disposition within the narrow region of interest is desired.

Yet another example of a situation where it is desirable to isolate reception to the PA-signal a single targeted PAS emitter (e.g., smart phone or smartwatch) while ignoring reception from nearby other PAS generators is at the order pickup window (e.g., 112). The packaged products which are to be handed over to the customer directly in front of the order pickup window may be logistically tied to the identity of that customer's PAS emitter. Hand over of packaged products to customers may undesirably become mixed up if the PA-signal of another generator is picked up rather than the PA-signal belonging to the customer directly in front of the order pickup window. Thus, a consistent (e.g., normalized) method of determining disposition within the narrow region of interest is desired. These are just examples.

The interior of the goods/services provisioning area 130 (e.g., kitchen) is not shown but may be understood to include various preparation and production stations including those for storing utensils, for assembling utensils (e.g., pots, pans) to be used for a specific order, for collecting raw or finished materials, for processing them (e.g., cooking meats, carbonating, mixing and/or cooling drinks, toasting bread slices, etc.) and packaging them (e.g., on trays or into bags) so that they can be conveniently provided to respective ones of the recipients (e.g., 123, 124, 114) at the appointed times and places, for example at the order pickup window (e.g., 112), based on pre-association with their specific PAS emitters. The interior of the goods/services production area 130 may alternatively or additionally include service providers (e.g., cooks, waiters, dishwashers, table bussers) who are charged with performing various work assignments at specific work stations. These production workers may also need to be available and in ready condition so that timely and high quality provisioning of requested goods/services can occur. In general, it takes time for preparation and production activities in the goods/services provisioning area 130 (or out on the floor) to complete and this preparation and/or production time should be accounted for when confirming (committing to) orders or other online or on-premise requests made by patrons of the establishment and when assuring that the promised goods/services are delivered as promised to the right customer. The establishment may have yet other specific areas, for example a back office logistics-processing area 131 within which specific personnel may be required to be present in very specific (e.g., narrow width) locations during predetermined times. It may be important to determine with a high degree of confidence that the PAS transmitter of one specific worker is present in a very specific region of interest even if there are other workers situated nearby with their own PAS transmitters turned on.

In one embodiment, the parking area 140 may include parking spaces 141a-141n (n being an indicator of number of parking spots) that can be reserved online. Various kinds of sensors including Bluetooth™ ones and/or magnetic proximity ones (127') may be used to sense whether or not a correct vehicle is positioned in respective ones of the reserveable or public spots 141a-141n and who is sitting in (or on) the vehicle (e.g., automobile, motorcycle, bus). The present teachings contemplate a patron (e.g., 123, 124) of an establishment (e.g., 100) making on online reservation for a reserveable parking spot (e.g., 141a-141n, optionally spots of different sizes), getting confirmation that the requested spot is reserved in a particular first time window for the patron and also pre-ordering goods/services and getting confirmation that the requested goods/services will be provided to that specific patron in the same first time window or in a second time window that starts after the start of the first time window. Thus the patron can receive assurances that both a parking spot and the correct requested goods/services will be timely provided.

Although FIG. 1 may be viewed as implying that customer populations and traffic flows in the exemplary establishment 100 are being well managed such that interior queue lines (e.g., 121) are neither too long or too short, such that exterior queue lines (e.g., drive-through lane 110) are neither too long or too short, such that goods/services preparation and production area (e.g., kitchen 130) is neither overwhelmed with too many orders nor underwhelmed with too few, and such that food items are provided in prime condition (e.g., hot and fresh) to the appropriate customers such outcomes do not come about inherently. If the establishment 100 accepts (commits to) too many online orders at once, the waiting areas may quickly fill with crowded together and upset customers. If the establishment 100 accepts (commits to) online orders made by prospective recipients who are far away (distance-wise or timewise) but prepares the food items too soon, the items will be cold and stale by the time the recipients arrive. If the establishment 100 accepts (commits to) online orders made by prospective recipients who are very close (distance-wise or timewise) and then tries to rush the food preparation to coincide with too-early arrival times by those nearby recipients when the kitchen is trying to fulfill the orders of customers who are already waiting, food quality may suffer and customer good will may be lost. On the other hand, if commitments to provide are made based on automatically repeated monitoring of recipient locations (e.g., to high degree of resolution for certain critical spots) and based on automatically repeated monitoring of capabilities to prepare and produce requested goods/services in timely and high quality fashion, many of these problems can be avoided or at least minimized. It is to be understood by the way that the establishment 100 (e.g., fast food venue) is not limited to fulfilling only online made requests for goods/services. Commitments (verbal or otherwise) may be made to other kinds of patrons including walk-ins. Some of the technology disclosed herein may be used to detect the presence of patrons other than those who make online requests for goods/services. The capacity of various physical wait areas and virtual wait-lists to timely accommodate online requests for goods/services may take into account detection of the other kinds of patrons and/or may take into account statistically-based predictions (e.g., made by an expert knowledge base) about how many of the other kinds of patrons are to be expected and when. In one embodiment, if the specific establishment (e.g., 100) decides not to commit to the online request for the goods/services, its software (e.g., downloaded mobile app 317) may automatically suggest alternate establishments to whom the request can be redirected, for example another branch of the same brand.

Figure 2A:
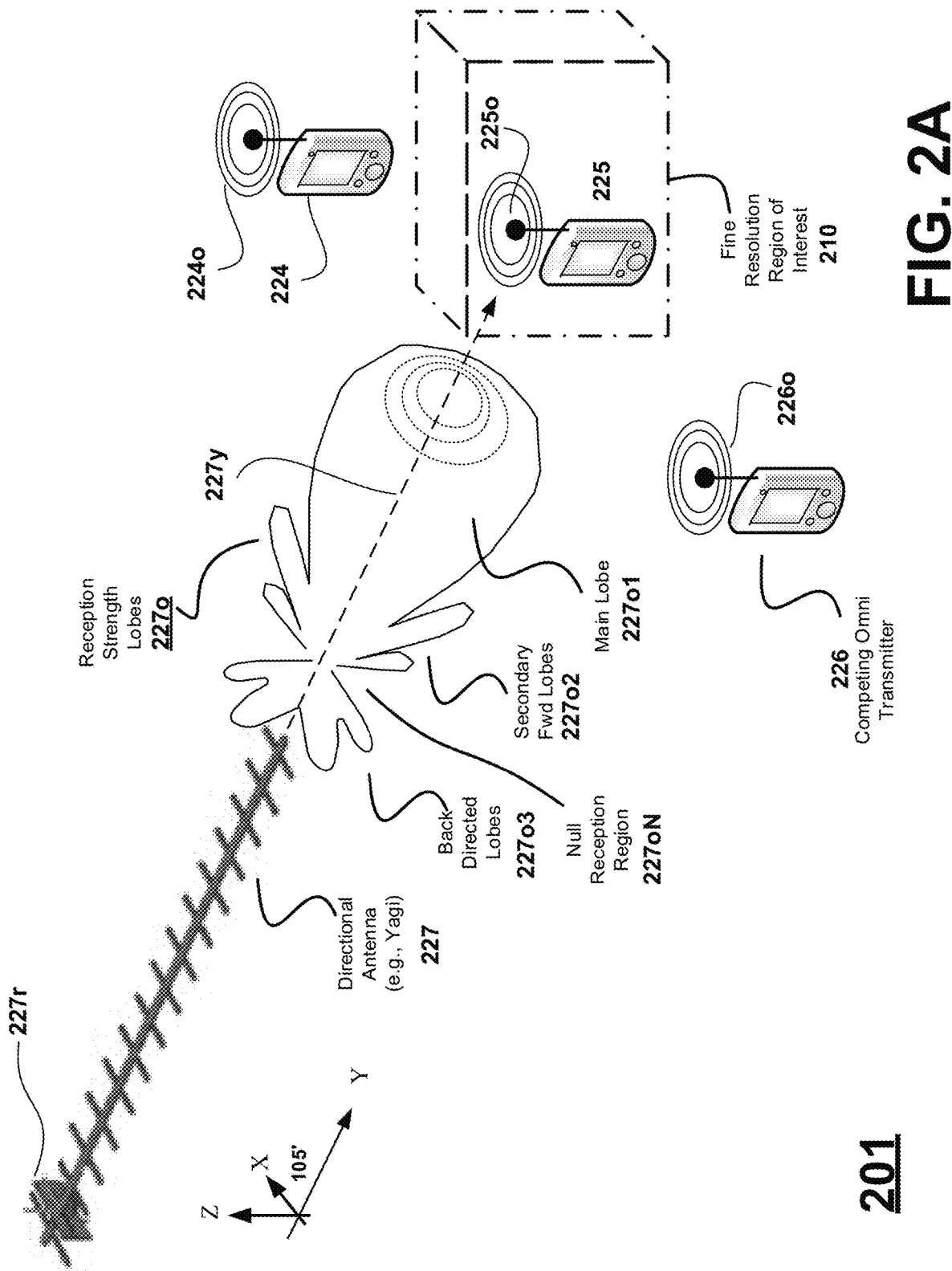
FIG. 2A is a schematic for explaining properties of an exemplary high gain directional antenna and the problem of a desired fine resolution region of interest (isolated detection region) being surrounded by interfering radio transmitters or other sources of noise.

FIG. 2A is a schematic diagram of a first situation 201 in which a high gain directional antenna 227 (e.g., a Yagi antenna in this example) is pointed directly towards (as indicated by longitudinal pointing axis 227y) a fine resolution region of interest 210 in which a single targeted PAS emitter 225 having an omnidirectional transmission output 225o is situated. However, in accordance with the problem recognized by the present disclosure, there may be another omni-directional transmitting PAS emitter 226 (having omnidirectional transmission output 226o) just outside a first side of the region of interest 210 but within the forward sensitivity lobe (227o1, discussed below) of the antenna. The omnidirectional transmission output 226o of the second emitter 226 may overpower that (225o) of the targeted PAS emitter 225. Additionally or alternatively, there may be yet a third omni-directional transmitting PAS emitter 224 (having omnidirectional transmission output 224o) just outside a second side of the region of interest 210. Its omnidirectional transmission output 224o may similarly overpower that (225o) of the targeted PAS emitter 225. The directional antenna 227 (and its associated radio receiver—not shown) may fail—due to the width of its one main lobe 227o1 of reception sensitivity—to pick up the PA-signal 225o of the targeted PAS emitter 225. This may occur because of interference from competing other PAS transmitters (e.g., 224 and 226) or because of general background noise. Although the example given here is of idealistic PAS emitters with omni-directional PA-signal transmission patterns, it is to be understood that the present teaching are not limited to omni-directional PA-signal transmission patterns. The PAS emitters may have other transmission patterns in free space and/or they may be enclosed within a structure (e.g., metallic frame of an automobile) that causes their emissions to be other than omni-directional. In other words, at a given location of reception, their signals may appear to have specific directionality (e.g., due to shielding by radio wave reflecting objects) and/or specific polarization.

FIG. 2A schematically shows a reception sensitivity surface (also referred to as reception strength lobes 227o) of the Yagi antenna 227. The reception sensitivity surface is depicted as being spaced forward (in the Y direction) of where it is actually located for sake of explanatory simplicity. In actuality, a main null reception region 227oN of the exemplary antenna would be positioned where the back reflector plate 227r of the antenna 227 is located. There would be some minor back-directed sensitivity lobes 227o3 behind the reflector plate 227r while the main or primary directional sensitivity lobe 227o1 extends forward of the reflector plate in the direction of the longitudinal axis 227y of the antenna. As further seen, the reception sensitivity surface may includes narrower, secondary forward lobes such as 227o2 separated from the main lobe 227o1 and each other by further null sensitivity regions (also referred to here as non-lobes, not separately identified). While not wishing to be bound by it, in accordance with one theory of operation of the present teachings, it s believed that just a peripheral part of the main forward lobe (e.g., 227o1) of a first directional antenna (e.g., 227a of FIG. 2B) is caused to overlap with just an oppositely disposed peripheral part of the main forward lobe (e.g., 227o1) of a second directional antenna (e.g., 227b of FIG. 2B) so that the null-sensitivity regions (non-lobes) just outside the peripheral parts work to diminish reception from emitters outside of the overlapped area (see briefly FIG. 2F). In other words, the null sensitivity regions surrounding the narrow forward lobes (e.g., 227o1) of the plural directional antenna operate to null out or reduce recognition of competing PAS transmitters such as 224 and 226. Although not shown, in one embodiment, one or more metallic shields or collimators or horns of appropriate sizes and locations are placed in front of the directional antenna for the purpose of blocking, diminishing and/or subdividing the main forward lobe or lobes (e.g., 227o1) of the antenna into even narrower reception sensitivity portions.

Figure 2B:
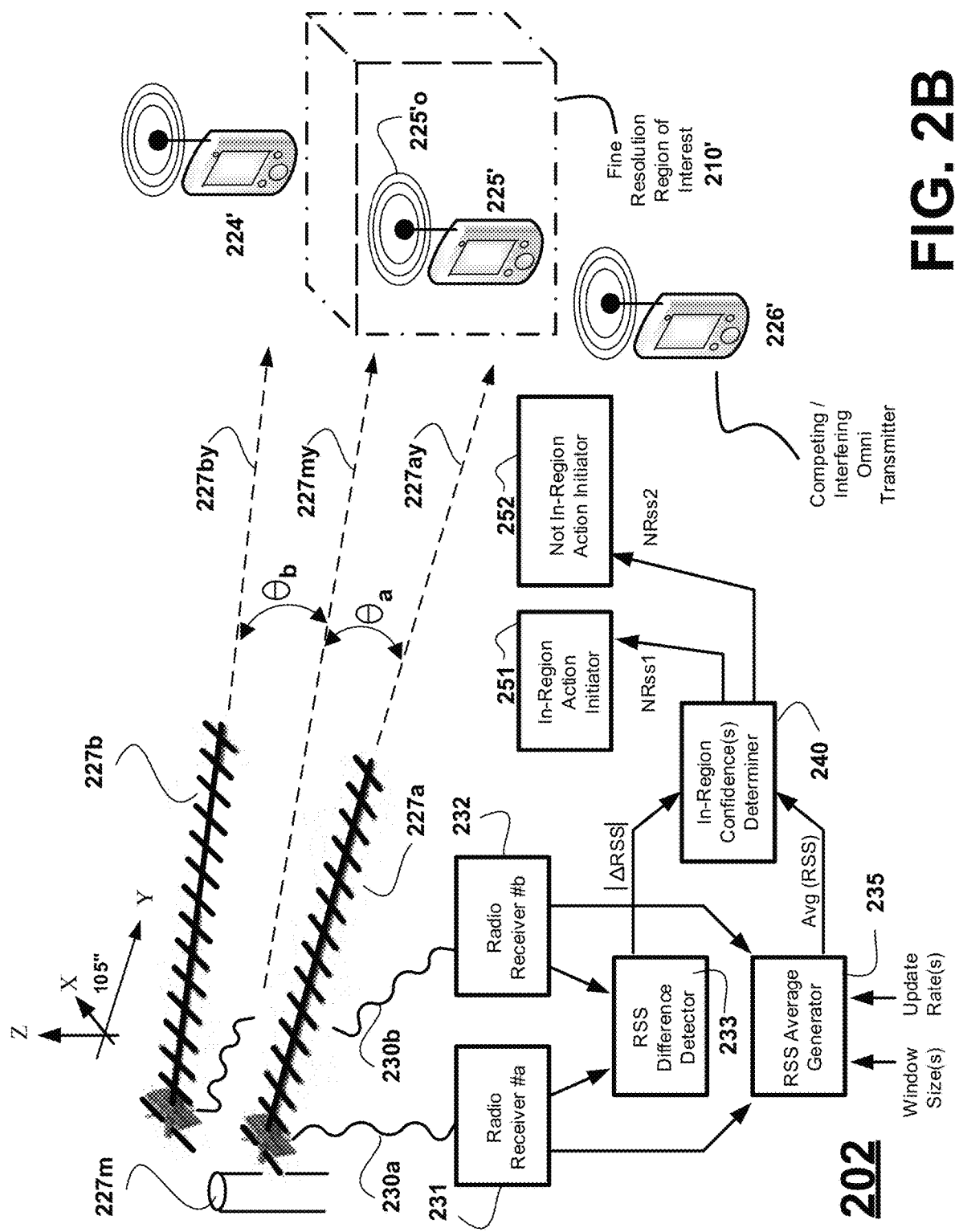
FIG. 2B is a schematic explaining how the fringe reception sensitivity lobes (and null sensitivity non-lobes) of two or more divergent directional antennas may be used to isolation-wise detect presence of a PAS broadcasting mobile device within a desired fine resolution region of interest despite being surrounded by interfering radio transmitters or other sources of noise.

Before moving on to FIG. 2B, it is to be appreciated that the present teachings are not limited to the exemplary Yagi antenna 227 depicted in FIG. 2A. The present disclosure contemplates a wide variety of directional antennas of different configurations including those with multiple reflector plates, metallic shields, collimators, horns, differently polarized stubs, various phased array configurations and so on. Each will have its respective reception strength sensitivity surfaces with respective reception lobes and non-reception (nulling) non-lobes. The one illustrated as 227o is merely for sake of example and for explaining the concept of different reception sensitivity lobes and the null sensitivity regions (non-lobes) surrounding them.

FIG. 2B schematically depicts an embodiment 202 in accordance with the present disclosure. In this exemplary embodiment 202, two identical directional antennas (e.g., Yagi antennas) 227a and 227b are co-located at a same height on a mounting pole 227m and close to one another while having essentially same vertical inclinations (e.g., downward toward the ground) and essentially same orientations with respect to signal polarization. However, their respective primary sensitivity axes 227ay and 227by are angled away from a central aiming vector 227my by respective co-planer and equal angles, θa and θb. In one embodiment, each of θa and θb is 45 and thus a total angle of divergence between the two identical directional antennas 227a and 227b is ninety degrees. In one embodiment, the mounting pole 227m is a tall one (e.g., ten feet or higher) the central aiming vector 227my points to the ground (e.g., a vehicle drive through lane extending in the X direction) such that the reception sensitivities of the respective antennas (e.g., 227a and 227b) do not extend to below the ground plane. Thus the region of co-sensitivity is shaped by the ground plane and by the area in which the forward lobes overlap. It is believed that adjustment of the angle of divergence will define the overlap area of main forward lobes (e.g., 227o1 of FIG. 2A) of the antennas so as to thereby define the corresponding fine resolution region of interest 210' while creating regions of null or lowered co-reception sensitivity for competing PAS transmitters such as 224' and 226' disposed nearby but just outside the corresponding fine resolution region of interest 210'. Depending on the specific directional antennas to be used and the location of the region of interest 210' relative to those antennas and the desired dimensions of the region of interest 210', it is believed that each of divergence angles θa and θb can be in the range of about 10 degrees to about 70 degrees, or in a subset of embodiments; in the range of about 30 degrees to about 60 degrees.

It is to be understood that the utilized plural directional antennas do not all have to be identical to one another or all diverging away from one another. There can be more than two such antennas. However, cost and complexity tend to increase as more antennas beyond two, particularly of different kinds, are used. Thus, for sake of cost containment, two antennas are sufficient. On the other hand, if more than two directional antennas are used, the third or yet additional antenna may have a different angle of vertical inclination than the first two, a different angle of horizontal divergence than the first two, and/or a different polarization than the first two. Pairs of such antennas may be used to verify substantial identity of signal polarization as contemporaneously received from the fine resolution region of interest or substantial identity of signal transmission direction or for other such signal reception characteristics.

In the example of FIG. 2B, the RF signal output port 230*a* of the first directional antenna 227*a* is operatively coupled to a first radio receiver 231. In one embodiment, an RF preamplifier (not shown) may be operatively mounted on the antenna itself. Similarly, the RF signal output port 230*b* of the second directional antenna 227*b* is operatively coupled to a second radio receiver 232 and a corresponding RF preamplifier (not shown) may be operatively mounted on the antenna itself. The RF conveying cables (230*a*, 230*b*) should be substantially identical and the radio receivers (231, 232) should be substantially identical. Each of the first and second radio receivers, 231 and 232 includes an internal received signal strength measuring module (not shown, but could be one including analog circuitry as well as digital circuitry). The included received signal strength measuring module measures an absolute or relative signal strength of the RF signal (e.g., within a predetermined frequency band or range and typically averaged over a short sampling window) as received from its respective antenna, 227*a* and 227*b*. This module outputs a corresponding, relative received signal strength indication (RSSI), typically as digital data and at a corresponding reporting rate corresponding to its signal strength sampling window. In one embodiment, the first and second radio receivers 231 and 232 are identical, located adjacent to one another and output respective relative received signal strength indications Rss1 and Rss2. It is to be appreciated that output RSSI signals from different brands and/or models of radio receivers can vary. They are merely relative indicators used for over-time comparison.

The RSSI data signals of the first and second radio receivers 231 and 232 are supplied to an RSS difference detector 233 which compares them by, for example generating an absolute value difference signal (|ΔRSSI|) obtained from subtracting simultaneously received or substantially contemporaneously received RSSI signals from the two receivers and then generating an absolute value from the subtraction result. (In an alternate embodiment, the subtraction of signal strength representing signals could be carried out as between analog portions of the internal received signal strength measuring modules of the radio receivers and this analog signal can then be digitized and output for further processing.) The RSSI data signals of the first and second radio receivers 231 and 232 are also supplied to an over-time RSS running average generator 235 which generates a running average for a predetermined and continuously advancing time window using the simultaneously received or substantially contemporaneously received RSSI signals from the two receivers. (In an alternate embodiment, the addition and overtime averaging of the signal strength representing signals could be carried out as among analog portions of the internal received signal strength measuring modules of the radio receivers and this running-average representing analog signal can then be digitized and output for further processing.) The respective update rates for generating the absolute value difference signal (|ΔRSSI|) and for generating the running average signal (Avg(RSS)) are empirically determined. In one embodiment it is on the order of about four to five samples per second (e.g., an update rate of about once every 100 ms, or 200 ms or longer). The running average advancing window for the running average signal (Avg(RSS)) can also be empirically determined. In one embodiment it is about 0.5 second long. More than one such running average signal (Avg(RSS)), each based on a different window size and update rate, may be used.

As mentioned, the measurement units for relative RSSI data are generally undefined and can vary from one brand of radio receiver to another. This makes it difficult to come up with a consistent software algorithm for determining with a consistent level of confidence whether a single targeted PAS emitter (e.g., 225' of FIG. 2B) is in the predefined fine resolution region of interest 210' or not. In accordance with one aspect of the present disclosure, a ratio is computed where the numerator of the ratio contains a current one of the absolute value difference signals (|ΔRSSI|) and the denominator of the ratio contains a current one of the running average signals (Avg(RSS)). This creates a normalized value, for example, (|ΔRSSI|)/(Avg(RSS)) where the relative measurement units of the respective radio receivers cancel out and thus a normalized confidence-representing signal is developed. Additionally or alternatively, a reciprocal normalized confidence signal can be created using the inverse ratio, in other words, (Avg(RSS))/(|ΔRSSI|). One or both of these ratios can be used to generate a normalized confidence indicating signal that indicates a degree of confidence as to the single targeted PAS emitter (e.g., 225') being at the center of the predefined fine resolution region of interest 210' or slightly spaced apart from the center (e.g., as programmatically determined by a favoritism weighting factor). In one embodiment, favoritism weighting factors D and (1−D) are respectively applied to the Rss1 and Rss2 values where D is in the range 0 to 1 so as to thereby change the location where D*Rss1−(1−D)*Rss2 goes to zero. In an embodiment where D=0.5, the absolute value difference signal (|ΔRSSI|) goes to zero when the omnidirectional radio output 225'*o* is centered on the central aiming vector 227*my* of the directional antennas (e.g., 227*a* and 227*b*).

As mentioned above, one example form for a confidence factor generating unit such as 240 of FIG. 2B appears as follows:

$$NRss = 100 - \frac{|Rss1 - Rss2|}{\text{Avg}(Rss1 + Rss2)} \quad \text{Eq. (1')}$$

where the 100 value is an arbitrarily picked maximum amount, where sampling for the Rss1 and Rss2 amounts is empirically determined based on the RSSI reporting rates of the utilized radio receivers and where the chronological window size for the running average factor is also empirically determined. In one embodiment, the running average window is 0.5 second long. It is within the contemplation of the present teachings to alternatively or additionally include the inverted ratio within the calculation of the NRss normalized confidence factor. A nonlinear saturating function may be used to prevent the inverted ratio, (Avg(Rss1+Rss2+ . . . ))/(|ΔRSSI|) from going to infinity. Various weighting factors and additive or subtractive constants may be empirically determined and used for application to individual terms or combinations thereof in the generating of the normalized confidence factor, NRss. When more than two directional antennas are used, the running average may be that of three or more of the respective receivers while separate difference factors are generated pairwise for different permutations of the antennas. More than one confidence factor (e.g., NRss1, NRss2) may generated at a time while using different computations for each (e.g., differently sized running average windows).

The one or more normalized confidence factors (e.g., NRss1, NRss2) are supplied to respective action initiators 251 and 252. Each action initiators (e.g., 251, 252) may use a respective threshold and timing algorithm for determining whether or not and when to take its respective action. Examples actions to be taken might include: IF NRss1>25 THEN signal order-taker that a customer is at the order placing window and logically associate the isolated PA-signal with the about to be taken order. Another example action might be, IF NRss2<20 THEN signal the order-taker that no customer is presently at the order placing window. In other words, specific actions or inactions may be caused to occur based on the determined confidence factor (NRssM, M being an integer here) that a single PAS emitter is present within a narrow region of interest (e.g., 210').

FIG. 2C (embodiment 203) schematically illustrates a variation in which a switched radio receiver 231' samples respective ones of plural directional antennas (there could be more than two), makes strength measurements (with strength sampler 231b), stores the strength measurements and then reports the respective strength measurements to Rss difference generator 233 and Rss running-average generator 235. An input switch 231a samples the signals (e.g., 230a', 230b') obtained from respective ones of the directional antennas (there could be more than two) and relays the samples to the strength sampler 231b. In one embodiment, the strength measurements are just for those of received PA-signals within a predetermined frequency range that contain a same emitter identification (e.g., HAC field). The strength sampler 231b digitizes its measurements and stores the digital information in a local memory (not shown). The local memory is accessed by a second switch 231c (or equivalent data processor—not shown). The accessed strength measurement data samples are then forwarded at appropriate times to the Rss difference generator 233 for generating pair-wise difference values (optionally with favoritism weights). As noted, there could be more than two antennas (not necessarily all identical ones). The Rss running-average generator 235 may use all the samples produced for a current over-time averaging window or only those for a select subset of the plural antennas. In one embodiment, an artificial intelligence algorithm (AI, e.g., a trained neural network) learns over time as to which combinations or permutations of Rss difference values and Rss running-average values work best with which of permutations of confidence level generating algorithms (e.g., Eq. 2) in which of possible contexts (e.g., time of day, concentration of customers) based on historical data stored in an associated database (not shown) and adjusts the run time system accordingly. In one variation, the Rss difference values and/or Rss running-average values can be produced in an analog portion of radio receiver 231' and thereafter digitized and stored in the local memory. Those skilled in the art will appreciate from the present disclosure that other variations may be used in accordance with the spirit of the present teachings (e.g., using plural sample generating radio receivers like 231').

Figure 2D:
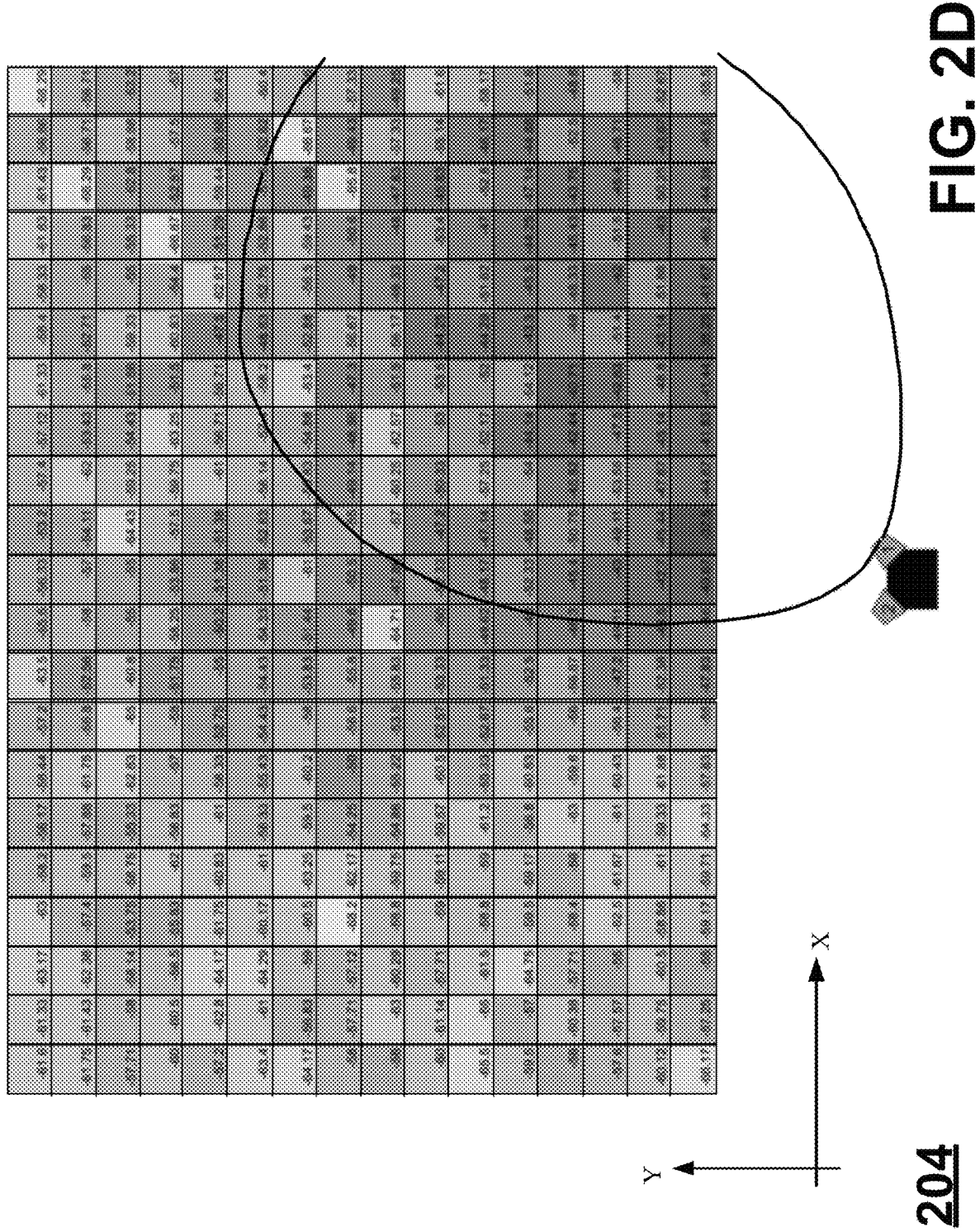
FIG. 2D depicts a reception heat map for a first of two divergent directional antennas as sampled over an XY grid map of a region adjacent to the divergent directional antennas.

FIG. 2D (test example 204) shows the results of a statistical survey taken over a commercial driveway adjacent to downward pointing and identical directional antennas 1 and 2 (each diverging at 45° to the roadway normal, Y axis). The readings in the grid boxes are statistically averaged values of relative signal strength at antenna 1 alone when different emitters (including attenuated ones) were stepped from one grid box to the next while background radio noise was present. The roughly elliptical pattern emanating from antenna 1 is an approximation of the footprint that the main forward lobe of antenna 1 casts on the tested driveway. As seen from the readings in the various grid boxes (ranging from about −40 to about −70, the less negative numbers representing stronger signals and colored as darker grid boxes) there is no clear cut differentiation between cases where the stepped through emitter was inside the cast elliptical pattern or outside for antenna 1.

Figure 2E:
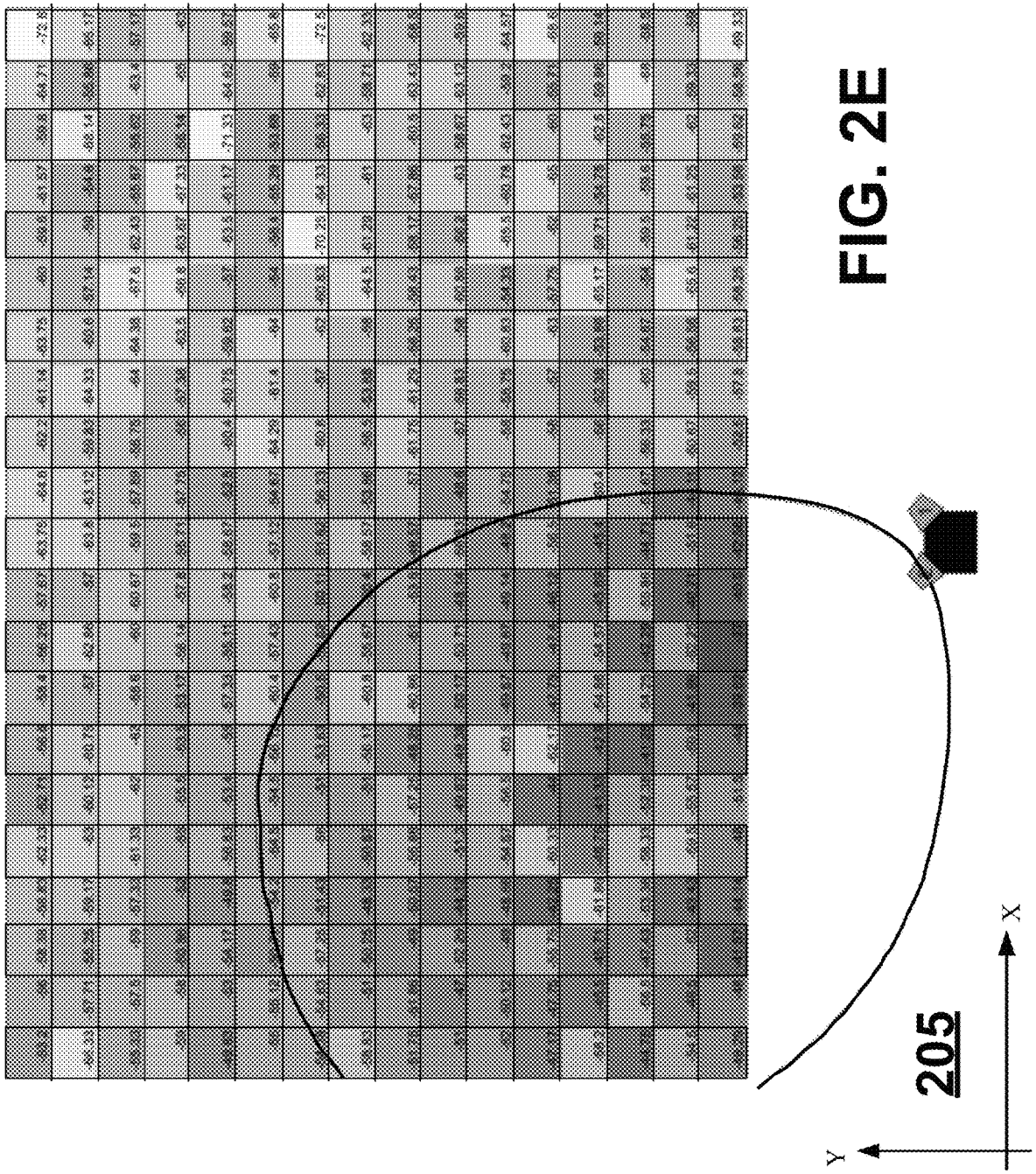
FIG. 2E depicts a reception heat map for a second of the two divergent directional antennas of FIG. 2D as sampled over the XY grid map of the region adjacent to the divergent directional antennas.

FIG. 2E (test example 205) shows the results of a statistical survey taken over the same commercial driveway adjacent to the downward pointing and identical directional antennas 1 and 2 (each diverging at 45° to the roadway normal, Y axis). The readings in the grid boxes are statistically averaged values of relative signal strength at antenna 2 alone when different emitters (including attenuated ones) were stepped from one grid box to the next while background radio noise was present. The roughly elliptical pattern emanating from antenna 2 is an approximation of the footprint that the main forward lobe of antenna 2 casts on the tested driveway. As seen from the readings in the various grid boxes (ranging from about −35 to about −73, the less negative numbers representing stronger signals and colored as darker grid boxes) there is no clear cut differentiation between cases where the stepped through emitter was inside the cast elliptical pattern or outside for antenna 2.

Figure 2F:
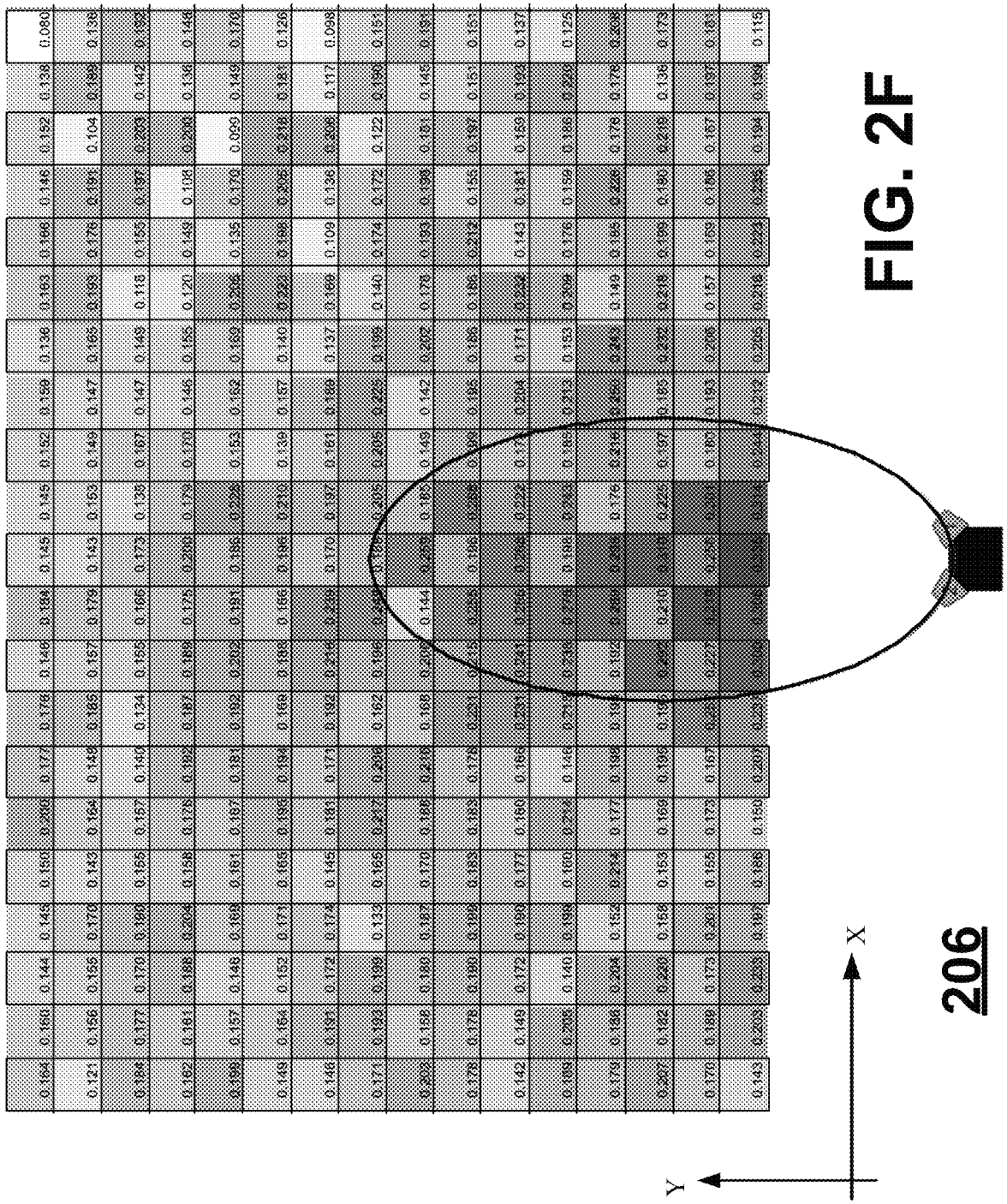
FIG. 2F depicts a commonality reception heat map for the XY grid map of the region adjacent to the first and second divergent directional antennas of FIGS. 2D and 2E where the commonality reception heat map indicates grid boxes that had substantially same reception signal strengths.

FIG. 2F (test example 206) shows the results of a statistical survey taken over the same commercial driveway adjacent to the downward pointing and identical directional antennas 1 and 2 (each diverging at 45° to the roadway normal, Y axis). The readings in the grid boxes are statistically averaged values of computation results for confidence level. In this particular case the confidence level computation used had the form of equation Eq. 4:

$$\text{Presence Level} = \left(1 - \frac{|RSSI_1 - RSSI_2|}{|200 + RSSI_1 + RSSI_2|}\right) \times \left(\frac{100 - 0.5 \times |RSSI_1 + RSSI_2|}{100}\right)^2 \quad \text{Eq. 4}$$

As seen in FIG. 2F, and indicated by the narrow elliptical pattern touching both of antennas 1 and 2, this time there is a clear differentiation between cases where the stepping through target emitter was inside the narrow elliptical pattern or outside. A threshold value of 0.25 was used to identify the most darkly colored grid boxes. Results below 0.25 are less darkly colored. Results below 0.15 are generally white. The system was able to automatically determine with a high degree of confidence when the PAS emitter was in a narrow region (no more than about 1 meter wide in the X direction) was directly in front of the central aiming vector of the divergent directional antennas despite the presence of background noise. The system was able to automatically reject instances where the PAS emitter was outside the narrow region of interest despite the presence of background noise.

Figure 3:
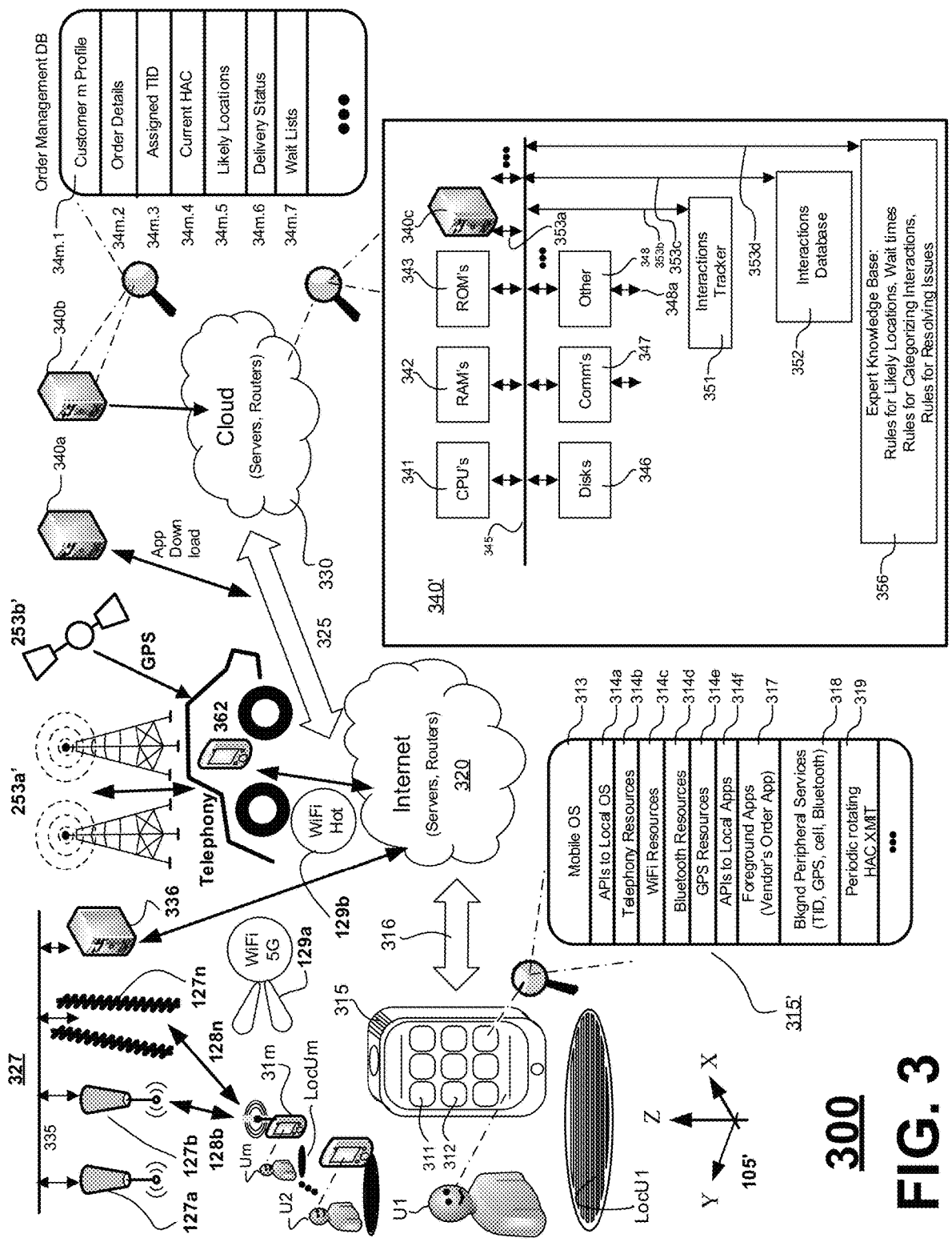
FIG. 3 illustrates a system for determining a location of a mobile user using a personal mobile device carried by the user.

Referring to FIG. 3, illustrated is a system 300 configured for location sensitive queues and wait-lists management where the system 300 includes portions for automatically determining both coarser and pinpointed respective locations (e.g., LocU1, . . . , LocUm) of respective mobile users (e.g., U1, U2, . . . , Um) using their respective personal mobile devices (e.g., 315, . . . , 31m) carried and/or worn by the users as the users traverse various areas including those serviced by cellular telephony base stations (e.g., cell towers 253a'—see also 253a of FIG. 2), serviced by GPS satellite constellations 253b' (see also 253b of FIG. 2) and serviced by finer resolution, location determining means (e.g., scanners 327—see also 127, 127', 127" of FIGS. 1 and 227a-227b of FIG. 2B). It is within the contemplation of the disclosure to use various types of scanners such as Wi-Fi ones (e.g., generation 5G ones that provide aimed beams). When a user enters a repeatedly scanned finer resolution area (e.g., 327 corresponding to 127, 127' and 127" of FIGS. 1 and 210' of FIG. 2B) that is covered by corresponding scanners 127a, 127b, 127n (n indicating the number of scanners in area 327) the users' respective locations can be determined to medium and finer degrees of resolution than that possible with just GPS and/or cellular telephony resources.

As indicated in magnified details area 315', the exemplary respective mobile device 315 of exemplary user U1 typically has a predetermined operating system (OS) 313 currently executing within it. Device 315 may have a set of application program-to-OS interfaces (APIs) 314a for allowing various further programs 317 within the device 315 to access resources of the OS 313. In one embodiment, the OS allows for OS mediated control over local telephony resources 314b, Wi-Fi interface resources 314c (e.g., including generation G4 resources), Bluetooth™ resources 314d, and GPS resources 314e. One of the API accessible resources of the OS is that for establishing one or more background peripheral services (BPSs) 318 that may be dynamically and wirelessly connected to from external devices (e.g., scanners 127a-127n). The executing OS 313 may on its own periodically test for presence of nearby Bluetooth™ and/or Wi-Fi devices (e.g., scanners 127a-127n, 5G Wi-Fi routers 129a,129b and alike other such short range transceivers) and in response to detected presence, occasionally wirelessly broadcast its own Bluetooth™ beacon and/or repeated Wi-Fi signal or other presence-advertising signal which includes a current hardware accessing code (HAC) of the mobile device 315. In one embodiment, the Bluetooth™ advertising signal has a unique and consistent signature portion that can be used for locating the HAC code as being positioned at a predetermined bit position of fixed bit distance away from a unique signature portion of the PA-signal. The HAC code may extracted based on its predetermined bit position relative to the signature even though the HAC code itself changes on a pseudorandom basis. The schematic of FIG. 3 illustrates the code for occasionally transmitting a rotating HAC as being disposed at section 319 of the personal mobile device. The schematic of FIG. 3 also depicts one or more of established BPSs at area 318. One of the BPSs is one which transmits a Bluetooth™ signal including an associated TID (a system-assigned temporary transaction ID sequence) when that BPS is connected to. Another of the BPSs is one which transmits a Wi-Fi signal revealing the current GPS coordinates of the mobile device 315 as well as identifying the mobile device (e.g., by its currently assigned TID). This Wi-Fi signal can be routed out via the internet to a server (e.g., 340b) controlled by the establishment. Another of the BPSs is one which transmits a Wi-Fi signal revealing the current cellular telephony coordinates of the mobile device 315 as well as identifying the mobile device (e.g., by its currently assigned TID). This Wi-Fi signal can be routed out via the internet to a server (e.g., 340b) controlled by the establishment. The establishment controlled server (e.g., 340b) may then determine current coarse locations of the mobile device based on the received GPS and/or telephony information and store the results in corresponding database entries (e.g., 34m.5).

Various foreground programs that may be used by the user while waiting for provisioning of the requested goods and/or services are depicted as being present in area 317. APIs to the local apps in the mobile device are depicted as being present in area 314f. One of the foreground programs that will be running in region 317 in accordance with one embodiment is the vendor's ordering and order progress advisement program. An example of an initial, program launching GUI for the mobile device is depicted at 315 with application invoking icons such as 311 and 312 being present on the displayed graphical user interface. One of the application invoking icons (e.g., 311 or 312) may cause a launching of a vendor's ordering and order progress advisement application. This application is stored in area 317 after being downloaded for example from a vendor controlled server 340a located in cloud 330 or elsewhere on the Internet 320.

FIG. 3 more broadly depicts an integrated client-server/ internet/cloud system 300 (or more generically, an integrated multi-device system 300) within which the here disclosed technology may be implemented. System 300 may be understood as being an automated machine system having distributed intelligent resources including a variety of differently-located data processing and data communication mechanisms including for example, user-carried/worn mobile wireless units (e.g., wireless smartphones 315, . . . , 31m) configured to allow end-users thereof (e.g., U1, U2 . . . . Um) to request from respective end-user occupied locations (e.g., LocU1) services from differently located enterprise hosts (e.g., on-internet 320 and/or in-cloud servers 340a, 340b, etc.). In one embodiment, server 340a handles the downloading of vendor ordering and order progress advisement apps into mobile devices that request them. The downloading process may include generating unique customer profiles (e.g., including billing information) and customer identifications that are to be used when the respective customers place orders at a later time. In one embodiment server 340b handles the managing of placed orders. Server 340b may include or connect to an order management database which keeps track for each order-placing user (e.g., user Um, where m is an integer) of: (a) the user's customer profile 34m.1, (b) the details of the placed order 34m.2; (c) a system-assigned temporary and unique transaction identification sequence (TID) 34m.3 assigned to the corresponding transaction; (d) a current hardware address (e.g., HAC) being currently used by the customer's personal mobile device (e.g., 31m.4); (e) a current one or more coarse and comparatively more pinpointed locations 34m.5 of where the recipient is determined to most likely be present at (e.g., in or near the establishment or further away and including those determined to high level of confidence using directional antennas); (f) information about the delivery status 34m.6 of the requested goods and/or services that the present transaction is directed to; and optionally additional information as may be appropriate for the vendor's business model.

It is to be understood that the illustrated configuration of system 300 is merely exemplary. As indicated, it comprises at least a few, but more typically a very large number (e.g., thousands) of end-user devices 315 (only a few shown in the form of wireless smartphones but understood to represent many similarly situated mobile and/or stationary client machines—including the smartphone wireless client kinds, smart watches, and cable-connected desktop kinds). These end-user devices 315 are capable of originating service requests which are ultimately forwarded to service-providing host machines (e.g., in-cloud servers like 340*b*) within a cloud environment 330 or otherwise on-internet or linked-to internet machines (e.g., 340*b*). Results from the service-providing host machines are thereafter typically returned to the end-user devices (315, . . . 31*m*) and displayed or otherwise communicated to the end-users (e.g., U1, U2, . . . , Um, m being an integer). For example, if the business of the vendor is an online, food pre-ordering one, the end-user (U1) may have installed on his/her smartphone (315) a software application ("app" 317) that automatically requests from the order managing server 340*b*, a list of nearest vendor venue locations, the menu of the items that may be ordered online and estimates for when the items will be ready for pick up at a selected one of the venues. In response to the request, enterprise software and hardware modules automatically identify the user, pull up a user profile (e.g., 34*m*.1), store the order details (34*m*.2), assign a temporary and unique transaction identification sequence (TID) 34*m*.3 to the corresponding transaction (install it into a corresponding one or more BPSs) and inform the customer of a time range when he or she might arrive at the venue to pick up the order as well a specific location for the pickup (e.g., a drive-through window with directional antenna detection of the user being directly in front of the window). The assigned TID may be downloaded into the BPSs of the ordering app at that time order placement or at a later time before it is needed.

When the customer (e.g., Um) arrives at the designated venue and enters an area covered by the location pinpointing scanners (127*a*-127*n*) of the venue, a fine resolution locating process is automatically carried out. Briefly, in one embodiment the presence of the HAC advertising mobile device is detected; an attempt is made to dynamically connect wirelessly to the TID-returning BPS of that mobile device; the TID is detected by at least one of the location pinpointing scanners (127*a*-127*n*) and the respective strengths of the TID-providing signals are measured at respective ones of the scanners including substantially simultaneously at co-located directional antennas. More specifically and merely as an example, if TID-returning signal 128*n* has the same relative signal strengths (RSSI's) at divergent directional antennas 128*n* then it may be automatically determined that the corresponding mobile unit 31*m* is located midway between antennas 127*n*. As another example, a set of scanners forming a closed regular polygon and each receiving the TID at just above a predetermined signal strength threshold are identified and the personal mobile device is automatically determined to be at the center of formed polygon (e.g., a triangle, rectangle, etc.). The scanners report their respective detections and measurements to a local server 336. The local server 336 then consults with a database or expert rules knowledge base to pinpoint the most likely one or more locations for the targeted customer in view of other factors (e.g., background noise, radio reflections, etc.) that may be currently present at the venue. The pinpointed one or more locations are then relayed to the tracking database, for example into entries region 34*m*.5. The entries region 34*m*.5 may store a history of recent locations and prediction of where the tracked user is most likely to be next located. A human or robotic server for assisting in quick delivery of the requested goods and/or services may then be dispatched to the predicted location of the customer.

In one embodiment, signal coupling from each of the fine resolution scanners (127*a*-127*n*) to the local server 336 is a wireless one such as conducted over a Wi-Fi network. Alternatively, Bluetooth™ signals may be used where one scanner (e.g., 127*a*) relays its detections and measurements to the next adjacent scanner (e.g., 127*b*) and so on until the collected detection and measurement reports are relayed to the local server 336. Signals coupling link 335 represents the various ways in which the respective detections and measurements of the scanners (127*a*-127*n*) are relayed to the local server 336. The signals coupling link 335 may be a wired one and/or may include wired and wireless subportions as opposed to being an all wireless signals coupling link.

In one embodiment, after receiving the respective detections and measurements of the scanners as well as the detected TID sequence, the local server 336 connects via the Internet 320 to the order management server 340*b*. The order management server 340*b* uses the relayed TID sequence to reference the corresponding customer order details 34*m*.1-34*m*.7 of user Um and his/her corresponding order. The order management server 340*b* may additionally consult with an expert knowledge base 356 (example shown in server 340') to determine, based on the relayed signal measurements of the scanners, what the one or more most likely current locations of the customer are at the respective venue and for the extant conditions there. When the ordered goods and/or services are ready for delivery to or pickup by the customer, the order management server 340*b* reports the latest one or more most likely locations of the establishment. For example the report may be in the form of a sorted list of most to least likely locations. In one embodiment, after pickup or delivery is reported as complete, the corresponding TID is erased from the user's mobile device and also from the database storage locations (e.g., 34*m*.3) so as to preserve privacy.

Aside from the end-user devices (e.g., 315, . . . , 31*m*) and the cloud servers (e.g., 340*b*) the system 300 comprises: one or more wired and/or wireless communication fabrics 316, 325, 335 (shown in the form of bidirectional interconnects) intercoupling the end-user client devices (e.g., 315, . . . , 31*m*) with the various networked servers (e.g., 336, 340*a*, 340*b*, 340').

Still referring to FIG. 3, a further walk through is provided here with respect to detailed components that may be found in one or more of the mobile devices and/or respective servers. Item 311 represents a first user-activatable software application (first mobile app) that may be launched from within the exemplary mobile client 315 (e.g., a smartphone, but could instead be a tablet, a laptop, a wearable computing device; i.e. smartwatch or other). Item 312 represents a second such user-activateable software application (second mobile app) and generally there are many more. Each end-user installed application (e.g., 311, 312) can come in the form of nontransiently recorded digital code (i.e. object code or source code) that is defined and stored in a memory for instructing a target class of data processing units to perform in accordance with end-user-side defined application programs ('mobile apps' for short) as well as to cooperate with server side applications implemented on the other side of communications links 316, 325, etc. In one embodiment and the case where an order is placed for respective goods and/or services by way of a non-mobile or not normally used client machine (e.g., a desktop computer), the order management server 340*b* automatically recognizes this condition and uses data available in the customer's profile 34*m*.1 to access the user's normally carried, personal mobile device and to transfer the assigned TID to that normally carried personal mobile device. In this instance, it is understood that appropriate, vendor provided software has been preloaded into the normally carried personal mobile device for securely enabling such transfer of the TID to the targeted mobile device. In this way, even if the customer places the order by way of a home desktop computer and then arrives at the venue with his/her normally-used mobile device, the customer tracking subsystem will still work.

More generally, each app (e.g., 311, 312, 317) may come from a different business or other enterprise and may require the assistance of various and different online resources (e.g., Internet, Intranet and/or cloud computing resources). Each enterprise may be responsible for maintaining in good operating order its portions of the system (e.g., local scanners, local servers, Internet, Intranet and/or cloud computing resources). Accordingly, the system 300 is shown as including in at least one server 340', an expert knowledge base 356 which contains various kinds of different expert rules for handling different conditions. One set of expert rules may provide for optimized customer location pinpointing when all the scanners (e.g., 127a-127n) at a given venue or venue observable area 327 are operational. Another set of expert rules may provide for less than optimum but acceptable customer location pinpointing when less than all of the scanners are operational and/or background noise is high. Yet another set of expert rules may provide for variable location determination based on different sets of furniture layout at each respective venue and/or based on expected radio interferences and/or reflections at the given venue. Yet other of the expert rules may relate to categorizing different types of transactions and details about how to handle them, including how to resolve various problematic issues.

In addition to the expert knowledge base 356, one or more other portions of the system 300 may contain interaction tracking resources 351 configured for tracking interactions between customers and respective vendors and an interactions storing database 352 configured for storing and recalling the tracked interactions. Links 353a (to a further server 340c), 353b, 353c and 353d represent various ways in which the system resources may communicate one with the other.

As mentioned, block 340' is representative of various resources that may be found in client computers and/or the various servers. These resources may include one or more local data processing units (e.g., CPU's 341), one or more local data storage units (e.g., RAM's 342, ROM's 343, Disks 346), one or more local data communication units (e.g., COMM units 347), and a local backbone (e.g., local bus 345) that operatively couples them together as well as optionally coupling them to yet further ones of local resources 348. The other local resources 348 may include, but are not limited to, specialized high speed graphics processing units (CPU's, not shown), specialized high speed digital signal processing units (DSPU's, not shown), custom programmable logic units (e.g., FPGA's, not shown), analog-to-digital interface units (A/D/A units, not shown), parallel data processing units (e.g., SIMD's, MIMD's, not shown), local user interface terminals and so on.

It is to be understood that various ones of the merely exemplary and illustrated, "local" resource units (e.g., 341-348) may include or may be differentiated into more refined kinds. For example, the local CPU's (only one shown as 341) may include single core, multicore and integrated-with-CPU kinds. The local storage units (e.g., 342, 343, 346) may include high speed SRAM, DRAM kinds as well as configured for reprogrammable, nonvolatile solid state data storage (SSD) and/or magnetic and/or other phase change kinds.

The local communication-implementing units (only one shown as 347) may operatively couple to various external data communicating links such as wired, wireless, long range, short range, serial, parallel, optical kinds typically operating in accordance with various ones of predetermined communication protocols (e.g., internet transfer protocols, TCP/IP, Wi-Fi, Bluetooth™ and so on). Similarly, the other local resources (only one shown as 348) may operatively couple to various external electromagnetic or other linkages 348a and typically operate in accordance with various ones of predetermined operating protocols. Additionally, various kinds of local software and/or firmware may be operatively installed in one or more of the local storage units (e.g., 342, 343, 346) for execution by the local data processing units (e.g., 341) and for operative interaction with one another. The various kinds of local software and/or firmware may include different operating systems (OS's), various security features (e.g., firewalls), different networking programs (e.g., web browsers), different application programs (e.g., product ordering, game playing, social media use, etc.) and so on.

The advantages of the present teachings over the art are numerous. It is to be understood that the present teachings are not to be limited to specific disclosed embodiments. In the above description and for sake of simplicity, a fast food restaurant venue is described. However, this disclosure may be applied, but not limited to, theaters (e.g., dinner theaters), stadiums, arenas, train stations, airports, big box store pickup areas and many other venues where it is desirable to track and pinpoint the location of a user of a normally carried and/or worn personal mobile device without encumbering the user to carry other devices not belonging to the user and/or not normally carried by the user.

Figure 4:
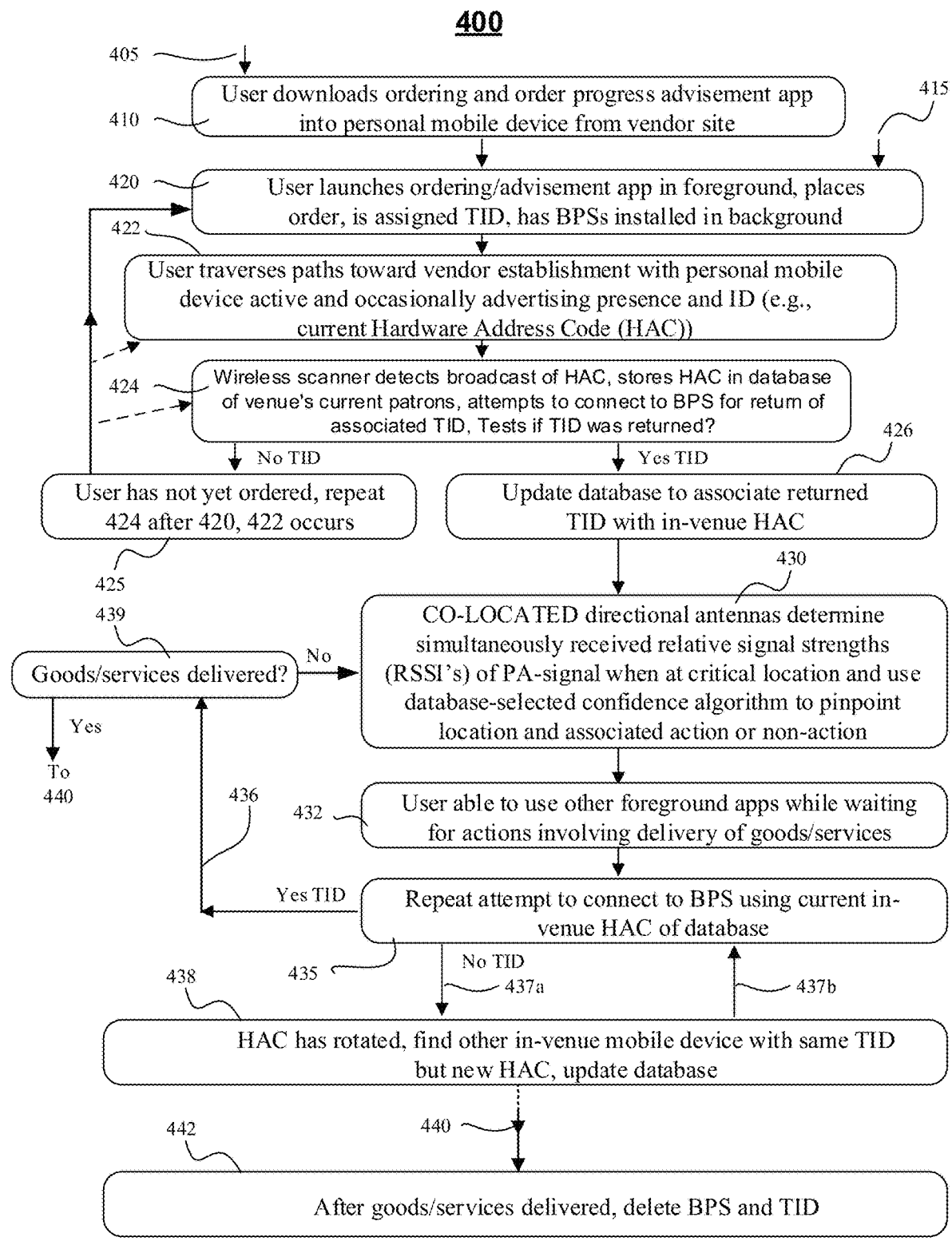
FIG. 4 is a flow chart of a tracking method that includes fine resolution presence detection.

FIG. 4 illustrates a method 400 for pinpointing the location of a PAS emitter. The method includes receiving respective requests (e.g., orders) for corresponding goods and/or services from respective patrons (e.g., 124) when they are at a first position, associating the received orders with a PA-signal broadcast by a PAS emitter (e.g., 125') possessed by the patron when at the first position, preparing to provide the ordered goods and/or services, using the PA-signal to detect presence of respective ones of the patrons at a second position and delivering the corresponding goods and/or services to the respective patrons at the second position.

Entry for first-time use of the method 400 may occur at 405, whereas later entry may occur at 415. In step 410 a user downloads into his/her normally used personal mobile device (e.g., smartphone 315, or a smartwatch or another normally or routinely carried and/or worn personal wireless device) an order or request submitting and progress advisement application (app) that is configured for placing orders or requests to one or more prespecified vendors and/or vendor venues (e.g., fast food establishments, sit-down restaurants, big box store item pickup areas) and for then providing an identified recipient with progress information such as when, where and how to receive the requested goods and/or services. It is within the contemplation of the present disclosure that the order or request submitting portion and the progress advisement portion are provided as two or more separate programs rather than one combined app. The order or request submitting and progress advisement application (app) may be downloaded via the Internet and from one or more vendor-specified websites. In one embodiment, the order or request submitting app may first be downloaded into a desktop or laptop computer of a user and used for ordering where after the progress advisement portion is transferred into a personal mobile device (e.g., 315) of an identified recipient (could be same as the order placer) for execution in that personal mobile device (e.g., 315).

In a subsequent step 420, the user launches the app as a foreground executed process on his/her normally used personal mobile device (e.g., smartphone 315) and, in one embodiment, uses the personal mobile device to order or request various goods and/or services for provisioning at one or more app-compatible vendor venues in accordance with order-placing guidances provided by the app. Typically, the app will cooperate with an in-cloud server and obtain an identification of the user and an identification of a time range in which the user expects provisioning of the ordered goods and/or services to occur. In an alternate embodiment, the user places the order at the venue by way of venue-provided ordering mechanism (e.g., a drive-up microphone into which the user speaks). Once the ordering details are completed and associated with the PA-signal of the user's personal mobile device, the in-cloud server downloads a unique and temporary identification number or other sequence (TID) to the personal mobile device (315) where this TID is uniquely associated with the specific order. The app also establishes within the user's personal mobile device one or more background peripheral services (BPSs) which may be dynamically connected to by external devices (e.g., the scanners 127a-127n at or near the vendor's venue). When a first of these established BPSs is connected to, and it temporarily awakens, broadcasts a Bluetooth™ signal containing the TID that has been assigned to the order and then goes back to sleep. The first BPS does not block the user from accessing foreground applications or services on his/her personal mobile device and does not consume significant battery power. Steps 410 and 420 may be carried out in the user's transport vehicle, home, office or elsewhere as convenient. They need not occur while the user is present in the vendor's scanners-covered establishment. In one embodiment, a second of the BPSs causes the user's mobile device to relay to a vendor accessible server (e.g., 340b), current location information of the mobile device as determined based on connection to cellular telephony equipment. In one embodiment, a second of the BPSs causes the user's mobile device to relay to a vendor accessible server, current location information of the mobile device as determined based on received GPS signals.

In step 422 the user (U1) arrives at the establishment and enters a scanners-covered area of the vendor's establishment while carrying his/her normally used mobile device (e.g., smart phone 315). For one class of embodiments (e.g., Apple iPhones™) the operating system (OS) of the mobile device automatically detects presence of external Bluetooth™ devices and occasionally broadcasts its own Bluetooth™ signals to thereby autonomously advertise its presence in the area and declare a current hardware address code (HAC) by way of which the personal device may be addressed. In one embodiment, the OS occasionally changes the HAC by which it is to be addressed.

In step 424 a Bluetooth™ receiver (e.g., one of scanners 127a-127n) detects the advertised HAC and checks a local database to determine if that HAC is already recorded in an area of the database listing current in-venue HAC's. If not there, the new HAC is added to the current in-venue HAC's listing with a timestamp indicating time of first recognition (e.g., first entry) into the scanned area. Old HAC's having a timestamp earlier than a moving time window may be automatically deleted from the listing by a garbage collecting subroutine.

Also in step 424, the detected HAC is used to address the corresponding personal device and to attempt to dynamically connect to the aforementioned first background peripheral service (BPS) that may have been established inside that personal device. If it is true that the first BPS has been established inside that personal mobile device, the first BPS is temporarily awakened, it responds by transmitting a Bluetooth™ signal including the uniquely-assigned TID and then it goes to sleep again.

Step 425 represents the case where the addressed personal mobile device does not return a TID (No TID). There could be a number of different reasons for this. One of them is that the user has not yet placed an order using the ordering app. Another is that the user may have temporarily shut off his/her personal mobile device and/or temporarily stepped out and away from the scanners-covered area. In such cases control is returned to one of steps 420, 422 and 424 as appropriate. The dashed return lines represent the selective choice of which of steps 422 and 424 is to be returned to based on circumstances.

Step 426 represents the case where the addressed personal mobile device does (Yes) return a TID. This condition informs the system that the in-venue and responding personal mobile device (315) has been used for or while placing an order and the returned TID identifies that order (and optionally the person who placed the order, when so done and from where and/or who is to be the recipient of the requested goods and/or services). In one embodiment, directional antennas are used to pinpoint the location of the personal mobile device as being within a first region of interest where orders are placed. The local database is then updated to logically associate the current HAC of the responding mobile device with the returned TID and with the corresponding order of requested goods and/or services (e.g., as to be provided via pickup window 112).

Step 430 represents the use of co-located directional antennas and respective radio receivers for simultaneously receiving (or receiving at substantially a same time relative to an update rate of the system) the broadcast PA-signals of the user's personal mobile device (315), selecting an appropriate confidence computation process from a database (based on extant context including time and crowding conditions), determining from use of the selected confidence computation process that the user's personal mobile device is isolated within a fine resolution region of interest (e.g., 210' of FIG. 2B) and taking corresponding action; or not taking that action if the computed confidence level is below a predetermined threshold. The determined presence of the user's personal mobile device in the pinpoint location is reported to an order management system. In one embodiment, the order management system tracks movements of the user and/or his/her personal mobile device so as to determine whether the user has settled at a relatively stable waiting location (e.g., seat 122) and what the coordinates of that location are or whether the user is advancing along a physical queue (e.g., 121, 110) towards a quick pickup window (e.g., 112) or counter. The order management system may then dispatch instructions to appropriate human and/or robotic service providers to advance or delay the preparation and/or production of the requested goods and/or services so that provisioning of the goods/services timely intersects with the determined or predicted location of the recipient in accordance with a current provisioning plan. Available level (e.g., fineness of) of location resolution may be dependent on the number of, closeness to each of the other of, and locations of the scanners (127a-127n) as well as whether all of them are operational, on background noise then present in the scanners-covered area, on signal strength measurement capabilities of the scanners, on radio signal reflection properties of the area, on transmission strengths of respective personal mobile devices of respective users and other factors.

Step 432 represents a waiting time for the being-tracked user (e.g., U1). During this waiting time 432, the user may access and use one or more foreground apps and/or services of his/her personal mobile device while not interfering with the occasional and temporary reawakening's of the TID-broadcasting first background peripheral service (BPS). The user-accessible one or more foreground apps and/or services may include games, web browsers, email applications, social media applications and so forth. The user therefore can be entertained or may conduct work tasks while waiting for delivery of the requested goods and/or services. One of the foreground apps and/or services may be the order progress advisement app which advises the user about the progress of, and/or currently planned time, location and method of providing the requested goods and/or services to that user.

While the user is waiting (as represented by step 432), a concurrent and automatically repeated other step 435 attempts to reconnect to the established first BPS of the HAC-addressed personal mobile device so as to again awaken the first BPS, have it repeat its transmission of the corresponding TID and then go back to sleep. If in the HAC-addressed personal mobile device responds again with the assigned TID (Yes), flow path 436 is taken and as long as the requested goods and/or services have not yet been provided (as determined in step 439), control returns to step 430 from which the loop is repeated as long as a TID is returned at step 435. The frequency of repetition of connection re-attempting step 435 may be a variable one. Each time the connection attempt is made and responded to by the user's personal mobile device, battery power is consumed in the mobile device. Thus to minimize consumption of battery charge out of the personal mobile device, the scanning system may intelligently vary the rate of its connection re-attempts 435 based on inferred states of the user. More specifically, if the user appears to be settled into a relatively stable state (e.g., 122) with minimized relocation, the rate of re-attempts can be reduced, for example down to a predetermined minimum rate, to thereby reduce battery consumption in the mobile device. On the other hand, if the user and/or his/her mobile device appear to be still moving/relocating by speeds greater than a predetermined threshold and/or by distances greater than the desired degree of resolution (e.g., 2 feet), then the rate of connection re-attempting 435 may have to be increased, for example up to a predetermined maximum rate for sake of keeping track of where the user is and/or for predicting where the user is heading towards and/or predicting when the user will arrive at a pre-scheduled provisioning spot (e.g., 112).

If the result of reconnection attempting step 435 is that no TID is returned, then path 437*a* is instead taken. For sake of security, some operating systems (e.g., that of the Apple iPhones™) automatically repeatedly change their hardware address code (HAC) on a semi-random basis. Thus, if no TID is returned at reconnection attempting step 435, the likelihood is that the targeted personal mobile device has changed (e.g., rotated) its current HAC. The new HAC will have been automatically determined in step 422 (which is carried out repeatedly for sake of finding other in-venue devices) and used for invoking the first BPS of the mobile device, receiving the TID and storing the result in the local database. Step 438 represents the recognition that this change of HAC has happened and represents an updating of the database to erase the cross association between the TID and the old and now obsolete HAC while reconfiguring the process to instead use the new HAC. Control may then be passed via flow path 437*b* to step 435 (or alternatively to bypass 435 and proceed along flow path 436) so the loop continues until the order management system determines at step 439 that the goods and/or services have been provided to the tracked user.

After the requested goods and/or services have been satisfactorily provided to the tracked user, flow path 440 is followed to step 442 where the tracking BPSs are automatically deleted from the user's personal mobile device and the TID is automatically deleted from the local database. This deletion step 442 assures that the BPSs and TID are ephemeral objects which disappear after the order has been fulfilled. As a result, the system stops tracking the user because no TID is returned when step 424 later attempts to reconnect to that personal mobile device. The user's privacy is therefore secured in that the details of the delivered order can no longer be found using the temporarily assigned TID.

In accordance with various embodiments of the present disclosure, the methods described herein may be implemented using one or more hardware computer systems that execute software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a digital processor of a digital programmable computer or other programmable data processing apparatus to produce a machine, such that the instructions, which execute via the processor of the computer or other programmable instruction execution apparatus, create a mechanism for implementing the functions/acts specified in the flowchart and/or block diagram block or blocks. All instructions need not be executed a by same one processor and can instead be distributed among a plurality of operatively cooperative processors. The terminology, 'at least one processor' as used herein is to be understood as covering both options, namely having one processor execute the all instructions or distributing the instructions for execution by two or more processors.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously or on an interrupted multi-tasking basis and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claimed subject matter.

What is claimed is:

1. A method that includes determining likelihood of presence of a radio presence-advertising signal (PA-signal, also PAS) emitter within a predetermined fine resolution region of interest, the method comprising:
   receiving at two or more co-located directional antennas, radio PA-signals repeatedly broadcast from the radio PAS emitter and relaying the received signals to one or more respective radio receivers used for the co-located directional antennas, the co-located directional antennas being directed to cover the predetermined fine resolution region of interest;
   in the respective one or more radio receivers, determining one or more respective reception characteristics of the radio PA-signals that were received at a substantially same time by two or more of the co-located directional antennas;
   determining a level of correlation between the determined one or more respective reception characteristics of the two or more of the respective radio PA-signals that were respectively received at a substantially same time by the two or more of the co-located directional antennas; and
   using the determined level of correlation to generate a confidence signal that indicates the likelihood of presence of the radio PAS emitter within the predetermined fine resolution region of interest, wherein the confidence signal is generated based on an antenna favoring factor and empirically picked constants.

2. The method of claim 1, wherein:
   the respective reception characteristics of the two or more of the respective radio PA-signals include respective signal strengths received by way of the two or more of the co-located directional antennas.

3. The method of claim 1, wherein:
   the respective reception characteristics of the two or more of the respective radio PA-signals include respective polarizations of the signals received by way of the two or more of the co-located directional antennas.

4. A method that includes determining likelihood of presence of a radio presence-advertising signal (PA-signal, also PAS) emitter within a predetermined fine resolution region of interest, the method comprising:
   receiving at two or more co-located directional antennas, radio PA-signals repeatedly broadcast from the radio PAS emitter and relaying the received signals to one or more respective radio receivers used for the co-located directional antennas, the co-located directional antennas being directed to cover the predetermined fine resolution region of interest;
   in the respective one or more radio receivers, determining corresponding strengths of the radio PA-signals that were received at a substantially same time by two or more of the co-located directional antennas;
   generating from the determined strengths, a current strength difference signal for at least one pair of the two or more respective radio PA-signals that were received at a substantially same time by two or more of the co-located directional antennas, the generated current strength difference signal indicating a difference between a first of the determined corresponding strengths, that is optionally weighted, and a second of the determined corresponding strengths, that is optionally weighted; and
   using the generated current strength difference signal to generate a confidence signal that indicates the likelihood of presence of the radio PAS emitter within the predetermined fine resolution region of interest, wherein the confidence signal is generated based on an antenna favoring factor and empirically picked constants.

5. The method of claim 4, and further comprising:
   generating from the determined strengths, a current over-time averaged strength signal for the received signals, the generated current over-time averaged strength signal indicating a current average value for two or more and optionally weighted ones of the determined strengths; and
   using the generated current over-time averaged strength signal to generate the confidence signal.

6. The method of claim 5, wherein:
   the generated confidence signal is a normalized one that is derived from a ratio having the generated current strength difference signal on one side of the ratio and having the generated current over-time averaged strength signal on an opposed side of the ratio.

7. The method of claim 5, wherein:
   the generating of the confidence signal has the form:

$$nNRss = A - B*|D*Rss1 - (1-D)*Rss2|^E - \frac{F}{(\text{Avg}(W1*Rss1 + W2*Rss2)^G} - H*\frac{|Rss1 - Rss2|}{\text{Avg}(Rss1 + Rss2)}$$

wherein A, B, E, F, G, H, W1, W2 are the empirically picked constants, D is the antenna favoring factor in the range 0 to 1 and nNRss can be a normalized or non-normalized confidence level indicating the likelihood that the PAS emitter is in the region of interest.

8. The method of claim 7, wherein:
   the picking of one or more of constants A, B, E, F, G, H, W1, W2 and D includes use of machine learning based on historical results stored in a database.

9. The method of claim 4, and further comprising:
   testing the generated confidence signal against a predetermined threshold level to determine if the radio PAS emitter is the only such PAS emitter within the predetermined fine resolution region of interest and is therefore isolated within the region of interest.

10. The method of claim 9, and further comprising:
responsive to the testing of the generated confidence signal against the predetermined threshold level, initiating a predetermined action.

11. The method of claim 10, wherein:
the initiating predetermined action includes associating the radio PAS emitter with an order for goods and/or services.

12. The method of claim 4, wherein:
the radio PAS emitter is a Bluetooth presence advisement emitter.

13. The method of claim 4, wherein:
the co-located directional antennas are vertically inclined downwardly towards the ground.

14. The method of claim 4, wherein:
the co-located directional antennas are fixedly mounted and the determined corresponding strengths used in generating the current strength difference signal are programmatically weighted so as to programmatically favor one of the directional antennas over at least another of the directional antennas.

15. The method of claim 4, wherein:
the predetermined fine resolution region of interest has width and length dimension of les than 2 meters each.

16. The method of claim 4, wherein:
the predetermined fine resolution region of interest is disposed along a drive-through pathway.

17. The method of claim 4, wherein:
the predetermined fine resolution region of interest is disposed along a walk-along pathway.

18. A machine system that is responsive to a likelihood that a radio PAS emitter is present within a predetermined fine resolution region of interest, the system comprising:
two or more co-located directional antennas structured to receive radio PA-signals repeatedly broadcast from the radio PAS emitter and to relay the received signals to one or more respective radio receivers used for demodulating the received signals, the co-located directional antennas being directed to cover the predetermined fine resolution region of interest;
respective signal strength measuring circuits in the respective one or more radio receivers, the measuring circuits structured to determine corresponding strengths of the radio PA-signals that were received at a substantially same time by two or more of the co-located directional antennas;
a first generator structured to generate from the determined strengths, a current strength difference signal for at least one pair of the two or more respective radio PA-signals that were received at a substantially same time by two or more of the co-located directional antennas, the generated current strength difference signal indicating a difference between a first of the determined corresponding strengths, that is optionally weighted, and a second of the determined corresponding strengths, that is optionally weighted; and
a second generator structured to use the generated current strength difference signal to generate a confidence signal that indicates the likelihood of presence of the radio PAS emitter within the predetermined fine resolution region of interest, wherein the confidence signal is generated based on an antenna favoring factor and empirically picked constants.

19. The system of claim 18 and further comprising:
a third generator structured to generate from the determined strengths, a current over-time averaged strength signal for the received signals, the generated current over-time averaged strength signal indicating a current average value for two or more and optionally weighted ones of the determined strengths;
wherein the second generator is further structured to use the generated current over-time averaged strength signal to generate the confidence signal.

20. The system of claim 19 wherein:
the generated confidence signal is a normalized one that is derived from a ratio having the generated current strength difference signal on one side of the ratio and having the generated current over-time averaged strength signal on an opposed side of the ratio.

21. The system of claim 18 and further comprising:
a confidence testing circuit that tests the generated confidence signal against a predetermined threshold level to determine if the radio PAS emitter is the only such PAS emitter within the predetermined fine resolution region of interest and is therefore isolated within the region of interest.

22. The system of claim 21 and further comprising:
an action initiating circuit that is responsive to the confidence testing circuit and initiates a predetermined action if the generated confidence signal is at or above the predetermined threshold level.

23. A computer system comprising one or more processors and a memory having collectively stored therein instructions that, when executed by the one or more processors, cause the one or more processors to determine a likelihood of presence of a radio presence-advertising signal emitter (PAS emitter) within a predetermined fine resolution region of interest, the executed instructions comprising:
obtaining from a respective one or more radio receivers, strength data representing corresponding strengths of the radio presence-advertising signals (PA-signals) that were received at a substantially same time by two or more of co-located directional antennas, the received radio PA-signals being those repeatedly broadcast from the radio PAS emitter and relayed to the one or more respective radio receivers that are operatively coupled to the co-located directional antennas, the co-located directional antennas being directed to cover the predetermined fine resolution region of interest;
generating from the determined strengths, a current strength difference signal for at least one pair of the two or more respective radio PA-signals that were received at a substantially same time by two or more of the co-located directional antennas, the generated current strength difference signal indicating a difference between a first of the determined corresponding strengths, that is optionally weighted, and a second of the determined corresponding strengths, that is optionally weighted; and
generating a confidence signal based on the generated current strength difference signal, the confidence signal indicating the likelihood of presence of the radio PAS emitter being within the predetermined fine resolution region of interest, wherein the confidence signal is generated based on an antenna favoring factor and empirically picked constants.

\* \* \* \* \*